United States Patent
Yamagaki et al.

(10) Patent No.: US 8,681,618 B2
(45) Date of Patent: Mar. 25, 2014

(54) PACKET RETRANSMISSION CONTROL SYSTEM, METHOD AND PROGRAM

(75) Inventors: Norio Yamagaki, Tokyo (JP); Kiyohisa Ichino, Tokyo (JP); Masato Yasuda, Tokyo (JP)

(73) Assignee: NEC Corporation, Tokyo (JP)

(*) Notice: Subject to any disclaimer, the term of this patent is extended or adjusted under 35 U.S.C. 154(b) by 82 days.

(21) Appl. No.: 13/137,075

(22) Filed: Jul. 19, 2011

(65) Prior Publication Data

US 2011/0280240 A1 Nov. 17, 2011

Related U.S. Application Data

(63) Continuation of application No. PCT/JP2010/071996, filed on Dec. 8, 2010.

(30) Foreign Application Priority Data

Dec. 14, 2009 (JP) .................................. 2009-283353

(51) Int. Cl.
H04L 12/26 (2006.01)

(52) U.S. Cl.
USPC .......................................... 370/231; 370/282

(58) Field of Classification Search
USPC ........................... 370/230, 236, 389, 469, 412
See application file for complete search history.

(56) References Cited

U.S. PATENT DOCUMENTS

2006/0222010 A1* 10/2006 Bosch et al. .................. 370/469
2009/0268747 A1* 10/2009 Kurata et al. ................. 370/412

FOREIGN PATENT DOCUMENTS

| JP | 9-116597 A | 5/1997 |
| JP | 11-046217 A | 2/1999 |
| JP | 11-177536 A | 7/1999 |
| JP | 2004-080413 A | 3/2004 |
| JP | 2007-124496 A | 5/2007 |

OTHER PUBLICATIONS

M. Allman, V. Paxson and E. Blanton, "TCP Congestion Control", IETF, RFC5681, Sep. 2009, pp. 7-9.
V. Paxson and M. Allman, "Computing TCP's Retransmission Timer", IETF, RFC2988, Nov. 2000, pp. 1-8.
T. Takamichi et al., "100Gbps Ultra-High Speed MAC Technology—A Study on the Terabit-Class LAN NIC-", IEICE Technical Report, OSC2008-112, Jan. 2009, pp. 31-36.
International Search Report (English translation)—FormPCT/ISA/210 (second sheet), Jul. 2009.
Written Opinion of the International Searching Authority—Form PCT/ISA/237, Jul. 2009.

* cited by examiner

*Primary Examiner* — Steven H Nguyen
*Assistant Examiner* — Henry Baron
(74) *Attorney, Agent, or Firm* — McGinn Intellectual Property Law Group, PLLC

(57) ABSTRACT

A packet retransmission control system has: a network control block configured to perform packet retransmission control in an upper layer; and a packet retransmission control block configured to perform packet retransmission control with a shorter retransmission timeout than the upper layer in a lower layer that is lower than the upper layer. If the network control block receives a duplicate acknowledge packet being an acknowledge packet notifying a same sequence number for a predetermined number of times, the network control block performs packet retransmission. The packet retransmission control block determines whether or not retransmission of a same packet is performed earlier in the upper layer than in the lower layer. If retransmission of the same packet is performed earlier in the upper layer than in the lower layer, the packet retransmission control block prohibits retransmission of the same packet in the lower layer.

20 Claims, 21 Drawing Sheets

Fig. 5

| FLOW IDENTIFICATION INFORMATION | TIMEOUT COUNTER | LOWER LAYER SEQUENCE NUMBER | UPPER LAYER SEQUENCE NUMBER | RETRANSMISSION BUFFER POINTER |
|---|---|---|---|---|
| Flow #100 | 5 | 50 | 1500 | Pointer #100_0 |
| Flow #100 | 3 | 100 | 3000 | Pointer #100_1 |
| .. | .. | .. | .. | .. |
| Flow #1 | 1 | 100 | 100 | Pointer #1_0 |

| FLOW IDENTIFICATION INFORMATION | TIMEOUT COUNTER | LOWER LAYER SEQUENCE NUMBER | UPPER LAYER SEQUENCE NUMBER | RETRANSMISSION BUFFER POINTER | BIDIRECTIONAL LIST CREATING POINTER |
|---|---|---|---|---|---|
| Flow #100 | 5 | 50 | 1500 | Pointer #100_0 | (NULL, NextP) |
| Flow #100 | 3 | 100 | 3000 | Pointer #100_1 | (PrevP, NULL) |
| .. | .. | .. | .. | .. | .. |
| Flow #1 | 1 | 100 | 100 | Pointer #1_0 | (NULL, NULL) |

104

PACKET RETRANSMISSION CONTROL SYSTEM, METHOD AND PROGRAM

CROSS-REFERENCE TO RELATED APPLICATION

This is a continuation of International Application No. PCT/JP2010/071996, filed on Dec. 8, 2010.

TECHNICAL FIELD

The present invention relates to packet retransmission control in a packet communication. In particular, the present invention relates to a technique of carrying out packet retransmission control in a layer lower than a protocol having a packet retransmission control function.

BACKGROUND ART

TCP (Transmission Control Protocol) is a widely used protocol in the Internet and corresponds to a fourth layer (transport layer) in the OSI (Open System Interconnection) reference model. The TCP establishes a connection between terminals and provides a reliable and efficient communication. In order to achieve this, the TCP is provided with several functions. One of the TCP functions is a packet retransmission control function that a sender, if a packet is lost in a network, retransmits the lost packet to a receiver. More specifically, the packet retransmission control function of the TCP includes: (A) packet retransmission by Fast Retransmit; and (B) packet retransmission by timeout.

In the case of the TCP, a receiver, when receiving a packet in a correct order, notifies a sender of a sequence number of the next packet which should be subsequently received. That is, an "ACK (ACKnowledge) packet" which acknowledges a sequence number of the packet received in the correct order is sent back to the sender. Here, an ACK packet which acknowledges the same sequence number is hereinafter referred to as a "duplicate ACK packet". In the case of the packet retransmission by the Fast Retransmit, as described in Non-Patent Literature 1, if the sender typically receives three duplicate ACK packets, the sender determines that it is highly possible that packets starting with the sequence number are lost, and retransmits the packets.

Also, the TCP retains a parameter called a Retransmission Timeout (RTO). As described in Non-Patent Literature 2, the RTO is calculated based on RTT (Round Trip Time). In the case of the packet retransmission by timeout, if a corresponding ACK packet is not sent back from the receiver within a time of the RTO after a packet is transmitted, the sender retransmits the corresponding packet.

Here, let us consider as an example a network in which the RTT is extremely short (about from several tens to several hundreds microseconds), such as that inside a data center. In such the network, if the RTO can be reduced to the order of microseconds, it is possible to shorten a period in which a new packet cannot be transferred because no ACK packet is sent back. This leads to improvement of communication efficiency.

However, since the TCP stack is in general implemented in an OS (Operating System) and the OS is implemented by software, it is not possible to set the RTO with high accuracy. For example, unit times (Jiffies) in Linux are 10 milliseconds, and therefore a standard TCP stack of the Linux cannot reduce the RTO to less than 10 milliseconds. Since the RTO of the TCP cannot be shortened to the order of microseconds, throughput of the TCP is deteriorated in a network such as in a data center.

As one of methods to solve the above problem, it has been proposed to perform the packet retransmission control also in a lower layer such as an MAC (Media Access Control) layer, as disclosed in Non-Patent Literature 3. More specifically, in the MAC layer which is lower than the TCP layer, the packet retransmission control is carried out by determining timeout in a microsecond level. As a result, the communication efficiency can be improved even in a network having a short RTT, without changing configurations of the OS nor the TCP stack. Note that a term "frame" instead of "packet" is in general used in a second layer such as the MAC layer, but both of them are used herein without being distinguished.

Patent Literature 1 discloses a packet data deleting method for avoiding collision of access to a buffer memory which retains transmission/reception packets including retransmission packets, in such a case where a wireless environment is assumed, a time required for data retransmission processing is measured in the MAC layer, and a packet exceeding the retransmission processing timeout is discarded to cancel retransmission of the packet.

Citation List

Patent Literature
Patent Literature 1: Japanese Patent Publication JP-2007-124496A
Non Patent Literature
Non-Patent Literature 1: M. Allman, V. Paxson and E. Blanton, "TCP Congestion Control", IETF, RFC5681, pp. 7-9, September 2009.
Non-Patent Literature 2: V. Paxson and M. Allman, "Computing TCP's Retransmission Timer", IETF, RFC2988, November 2000.
Non-Patent Literature 3: T. Takamichi et al., "100 Gbps Ultra-High Speed MAC Technology—A Study on the Terabit-Class LAN NIC-", IEICE Technical Report, OSC2008-112, January 2009.

SUMMARY OF INVENTION

As described above, in the case of the Fast Retransmit of the TCP, the packet retransmission is performed triggered typically by receiving of three duplicate ACK packets. FIG. 1A shows an example of the packet retransmission by the Fast Retransmit of the TCP. In FIG. 1A, packets P100 to P104 are transmitted from a sender, wherein the packet P101 following the packet P100 is lost in a network. An ACK packet responding to the correctly received packet P100 is expressed by ACK100. Also, three duplicate ACK packets which acknowledge the same sequence number as the ACK100 are expressed by Duplicate ACKs 1 to 3, respectively. In response to the third duplicate ACK packet, the Fast Retransmit of the TCP is activated and the sender retransmits the packet P101 which is requested by the ACK100.

FIG. 1B shows a case where the packet retransmission by the timeout is performed also in the lower layer such as the MAC layer. In FIG. 1B, a solid line represents a TCP packet and a dashed line represents a packet in the lower layer. Here, as shown in FIG. 1B, the Fast Retransmit of the TCP may be activated earlier than the packet retransmission by the timeout in the lower layer, depending on the cases. In this case, after the packet P101 is retransmitted by the Fast Retransmit of the TCP, a timeout of the packet P101 occurs in the lower layer and then the packet P101 is retransmitted by the lower layer.

That is, the retransmission of the packet P101 becomes redundant. This causes wasting of a network bandwidth.

As an example, let us consider a high-bandwidth and low-delay network where a link transmission capability is 10 Gbps and the RTT is about 50 microseconds. The RTO in the lower MAC layer is set to a value larger than the RTT and, for example, set to 100 microseconds being double the RTT. Meanwhile, a transmission interval for a MAC frame of 1500 byte is about 1.2 microseconds (=1500×8 bits/10 Gbps). Therefore, the Fast Retransmit of the TCP is started at about 60 microseconds (≈RTT+3×1.2 microseconds). In this case, the Fast Retransmit of the TCP is activated earlier than the packet retransmission by the timeout in the lower layer, which results in the redundant retransmission of the packet P101.

An object of the present invention is to provide a technique that can prevent redundant retransmission of a same packet in a case where the packet retransmission control is carried out both in an upper layer and a lower layer.

In an aspect of the present invention, a packet retransmission control system is provided. The packet retransmission control system has: a network control block configured to perform packet retransmission control in an upper layer; and a packet retransmission control block configured to perform packet retransmission control with a shorter retransmission timeout than the upper layer in a lower layer that is lower than the upper layer. If the network control block receives a duplicate acknowledge packet being an acknowledge packet notifying a same sequence number for a predetermined number of times, the network control block performs packet retransmission. The packet retransmission control block determines whether or not retransmission of a same packet is performed earlier in the upper layer than in the lower layer. If retransmission of the same packet is performed earlier in the upper layer than in the lower layer, the packet retransmission control block prohibits retransmission of the same packet in the lower layer.

In another aspect of the present invention, a packet retransmission control method is provided. The packet retransmission control method includes: (A) performing packet retransmission control in an upper layer; and (B) performing packet retransmission control with a shorter retransmission timeout than the upper layer in a lower layer that is lower than the upper layer. The above-mentioned (A) performing packet retransmission control in the upper layer includes: (A1) performing packet retransmission, if a duplicate acknowledge packet being an acknowledge packet notifying a same sequence number is received for a predetermined number of times. The above-mentioned (B) performing packet retransmission control in the lower layer includes: (B1) determining whether or not retransmission of a same packet is performed earlier in the upper layer than in the lower layer; and (C) prohibiting retransmission of the same packet in the lower layer, if retransmission of the same packet is performed earlier in the upper layer than in the lower layer.

In still another aspect of the present invention, a packet retransmission control program which causes a computer to perform packet retransmission control processing is provided. The packet retransmission control processing includes: (A) performing packet retransmission control in an upper layer; and (B) performing packet retransmission control with a shorter retransmission timeout than the upper layer in a lower layer that is lower than the upper layer. The above-mentioned (A) performing packet retransmission control in the upper layer includes: (A1) performing packet retransmission, if a duplicate acknowledge packet being an acknowledge packet notifying a same sequence number is received for a predetermined number of times. The above-mentioned (B) performing packet retransmission control in the lower layer includes: (B1) determining whether or not retransmission of a same packet is performed earlier in the upper layer than in the lower layer; and (C) prohibiting retransmission of the same packet in the lower layer, if retransmission of the same packet is performed earlier in the upper layer than in the lower layer.

According to the present invention, it is possible to prevent redundant retransmission of a same packet in a case where the packet retransmission control is carried out both in an upper layer and a lower layer.

BRIEF DESCRIPTION OF DRAWINGS

The above and other objects, advantages and features of the present invention will be more apparent from the following description of certain exemplary embodiments taken in conjunction with the accompanying drawings.

FIG. 5 is a conceptual diagram showing an example of a packet information memory block in the first exemplary embodiment.

FIG. 14 is a conceptual diagram showing an example of a packet information memory block in the third exemplary embodiment.

DESCRIPTION OF EMBODIMENTS

Exemplary embodiments of the present invention will be described below with reference to the attached drawings.

1. First Exemplary Embodiment 1-1. Configuration

Figure 1A:
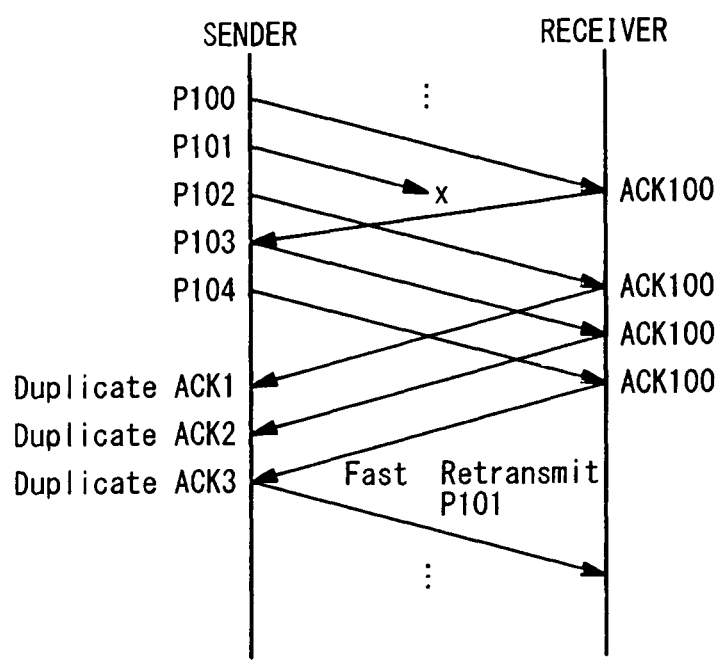
FIG. 1A shows an example of packet retransmission by the Fast Retransmit of the TCP.
Figure 1B:
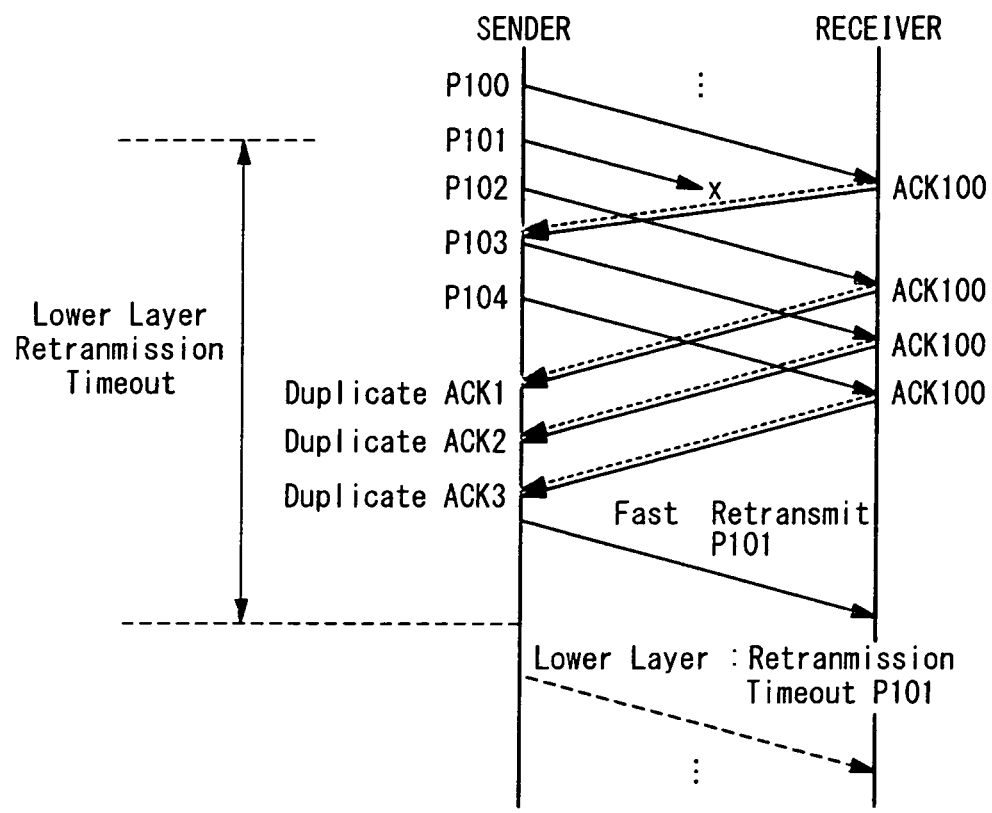
FIG. 1B shows a case where the Fast Retransmit of the TCP is activated earlier than in a timeout in a lower layer such as the MAC layer.
Figure 2:
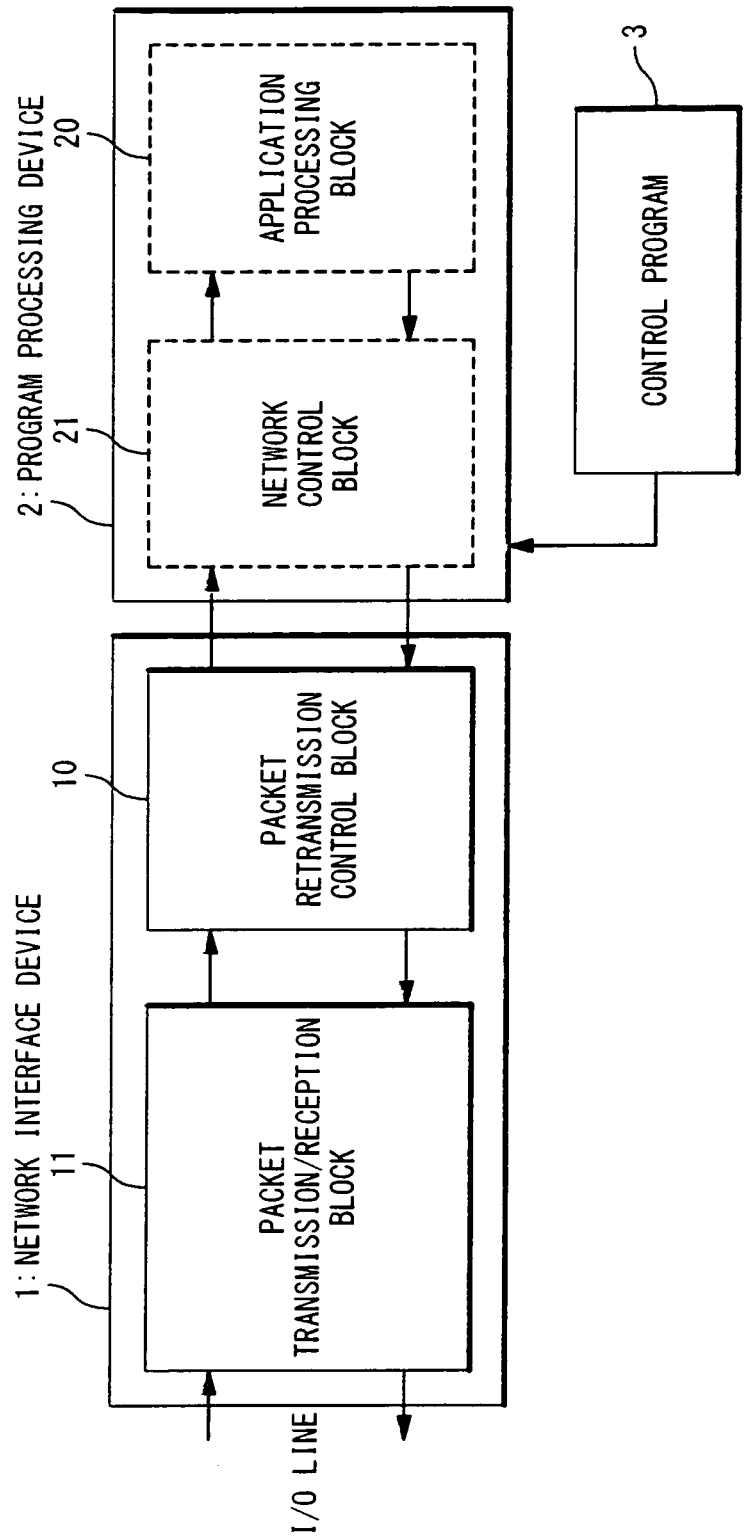
FIG. 2 is a block diagram showing a configuration of a packet retransmission control system according to a first exemplary embodiment of the present invention.

FIG. 2 is a block diagram showing a configuration of a packet retransmission control system according to a first exemplary embodiment of the present invention. The packet retransmission control system has a network interface device 1, a program processing device 2 and a control program 3.

The program processing device 2 deals with an application and a network protocol stack. The program processing device 2 is achieved by a CPU (Central Processing Unit) of a host, such as a server and a PC, and so on. The control program 3 is a computer program executed by the program processing device 2 and controls an operation of the program processing device 2.

More specifically, the program processing device 2 has an application processing block 20 and a network control block 21 that are achieved by executing the control program 3.

The application processing block 20 deals with a user application that performs network communication. The application processing block 20 requests the network control block 21 to transmit/receive a network data.

The network control block 21 is, for example, a part of a kernel program of OS (Operating System) which operates on the CPU of the host. The network control block 21 carries out packet transmission/reception processing, packet retransmission control and sequential control in an upper layer such as the TCP layer. Here, the network control block 21 carries out not only packet retransmission based on a predetermined retransmission timeout but also packet retransmission by the Fast Retransmit. That is, the network control block 21 performs the packet retransmission if it receives the duplicate ACK packet for a predetermined number of times (which is typically three times).

The network interface device 1 is, for example, a NIC (Network Interface Card) installed on a server as an extension card or an on-board card. The network interface device 1 carries out packet transmission/reception processing and packet retransmission control in lower layers. More specifically, the network interface device 1 has a packet transmission/reception block 11 and a packet retransmission control block 10.

The packet transmission/reception block 11 has functions of a physical layer and a data link layer (MAC), and outputs a packet received from the packet retransmission control block 10 to a network (output line). Moreover, the packet transmission/reception block 11 receives a packet from a network (input line) and outputs it to the packet retransmission control block 10. At this time, if a packet error is detected by CRC (Cyclic Redundancy Check) with respect to a checksum or the like, the packet transmission/reception block 11 notifies the packet retransmission control block 10 of the packet error.

The packet retransmission control block 10 performs the packet retransmission control in the MAC layer which is lower than the network protocol of the network control block 21. Here, a retransmission timeout in the MAC layer as the lower layer is set to be shorter than a retransmission timeout in the TCP layer as the upper layer. That is, the packet retransmission control block 10 performs the packet retransmission control with a shorter retransmission timeout than that of the TCP. Moreover, the packet retransmission control block 10 determines whether or not retransmission of a same packet is performed earlier in the TCP layer than in the MAC layer. If retransmission of a same packet is performed earlier in the TCP layer than in the MAC layer, the packet retransmission control block 10 prohibits the retransmission of the same packet in the MAC layer. The details will be described later.

Figure 3:
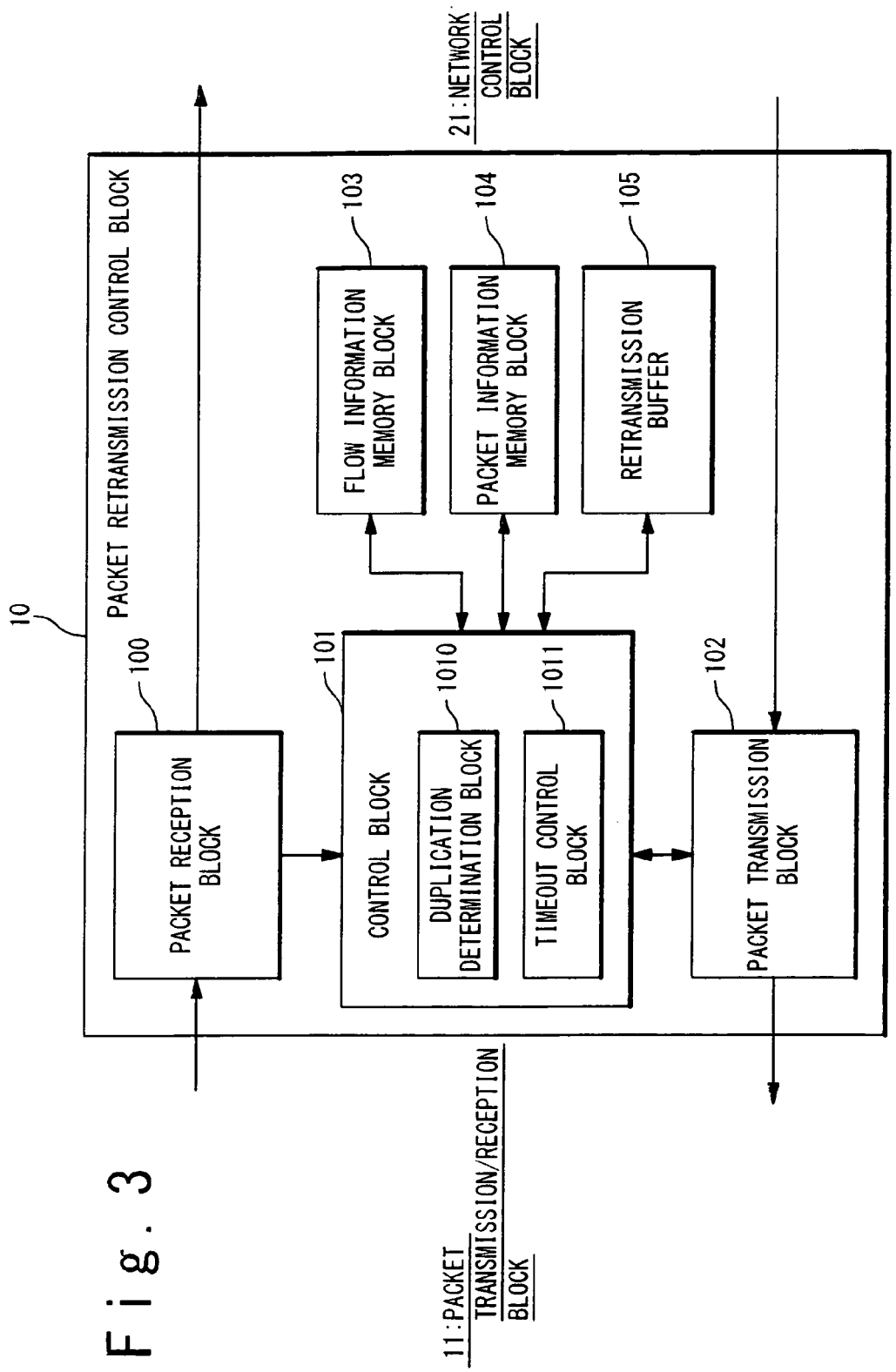
FIG. 3 is a block diagram showing a configuration of a packet retransmission control block in the first exemplary embodiment.

FIG. 3 is a block diagram showing a configuration of the packet retransmission control block 10. The packet retransmission control block 10 has a packet reception block 100, a control block 101, a packet transmission block 102, a flow information memory block 103, a packet information memory block 104 and a retransmission buffer 105.

When the packet retransmission control system transmits a packet to a network, the packet transmission block 102 receives the transmission packet from the network control block 21. The packet transmission block 102 sets, to the received transmission packet, an internal header including a unique sequence number in the MAC layer or the like. Then, the packet transmission block 102 not only outputs the transmission packet to the packet transmission/reception block 11 but also outputs a copy of the transmission packet to the control block 101. There is also a case in which the packet transmission block 102 receives a transmission packet (such as a retransmission packet and a control packet (ACK, NACK) in the MAC) from the control block 101. In this case, the packet transmission block 102 outputs the transmission packet to the packet transmission/reception block 11.

When the packet retransmission control system receives a packet from a network, the packet reception block 100 receives the received packet from the packet transmission/reception block 11. The packet reception block 100 analyzes a type of the received packet based on information of the internal header of the received packet. The packet types include an ACK packet in the MAC, an NACK (Negative ACKnowledgement) packet in the MAC indicating that data is not received correctly, an ACK packet in the TCP and the like. The packet reception block 100 notifies the control block 101 of the type of the received packet along with other necessary information. If the received packet is not a control packet (such as ACK and NACK) in the MAC, the packet reception block 100 removes the internal header from the received packet and then forwards the received packet to the network control block 21. A control packet (such as ACK and NACK) in the MAC is not forwarded to the network control block 21. Moreover, if it is notified from the packet transmission/reception block 11 that the received packet has an error, the packet reception block 100 notifies the control block 101 of the error.

Figure 4:
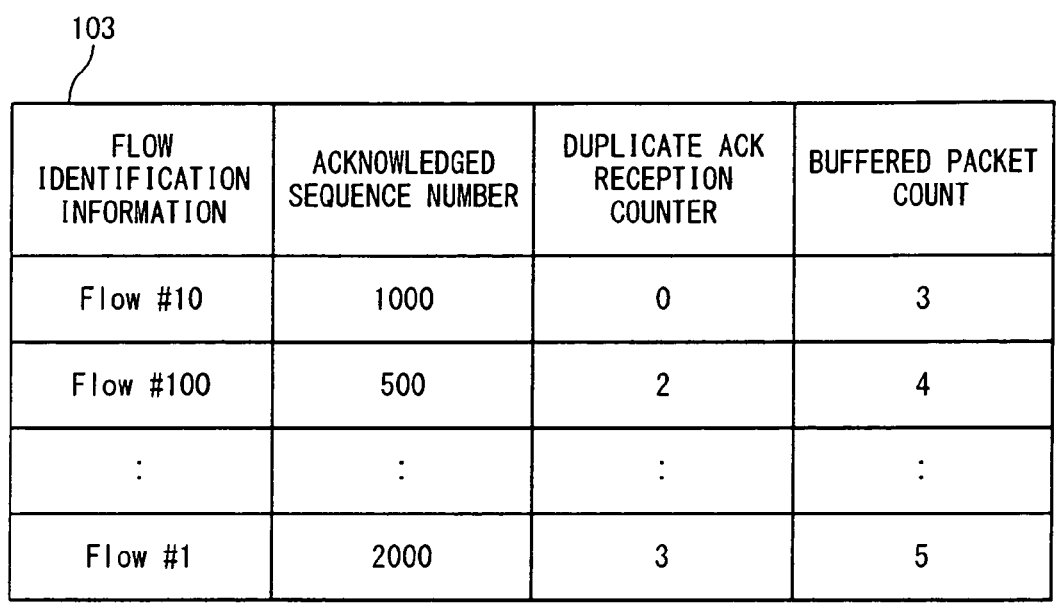
FIG. 4 is a conceptual diagram showing an example of a flow information memory block in the first exemplary embodiment.

The flow information memory block 103 is used for managing flows to which packets stored in the retransmission buffer 105 belong. Here, the "flow" means a TCP session. More specifically, the flow information memory block 103 stores information with respect to each of flows to which packets stored in the retransmission buffer 105 belong. FIG. 4 is a conceptual diagram showing an example of the flow information memory block 103. The information with respect to each flow stored in the flow information memory block 103 includes flow identification information, an acknowledged sequence number, a duplicate ACK reception counter and a buffered packet count. The flow identification information is information for identifying a flow (or TCP session). Typically, the flow identification information consists of a part of header information in the upper layer. For example, a source address, a destination address and a protocol number in an IP header as well as a source port number and a destination port number in a TCP header and the like are used as the flow identification information. It should be noted that, for simplicity, the flow identification information is expressed as "Flow #100" in the diagram. The acknowledged sequence number is a sequence number which is already acknowledged by the ACK packet in the TCP. The duplicate ACK reception counter is the number of times of receiving a duplicate ACK packet by the network control block 21 in the upper layer. Here, the duplicate ACK packet is an ACK packet that acknowledges the same sequence number as the acknowledged sequence number. The buffered packet count is the number of packets of the flow which are stored in the retransmission buffer 105.

The packet information memory block 104 is used for managing packets stored in the retransmission buffer 105. More specifically, the packet information memory block 104 stores information with respect to each of packets stored in the retransmission buffer 105. FIG. 5 is a conceptual diagram showing an example of the packet information memory block 104. The information with respect to each packet stored in the packet information memory block 104 includes flow identification information, a timeout counter, a lower layer sequence number, an upper layer sequence number and a retransmission buffer pointer. The flow identification information is identification information of a flow to which the packet belongs, and is the same as the flow identification information in the flow information memory block 103. The timeout counter is a count value used for determining retransmission timeout in the MAC layer. Note that a method of determining retransmission timeout is not limited to the counter, and various public-known determination methods are applicable. Other parameters (such as time stamp) instead of the timeout counter may be used, depending on the determination method. The lower layer sequence number is a sequence number allocated uniquely in the MAC layer. The upper layer sequence number is a sequence number in the TCP. The retransmission buffer pointer is a pointer such as an address value in the retransmission buffer 105 in which the packet is stored.

Figure 6:
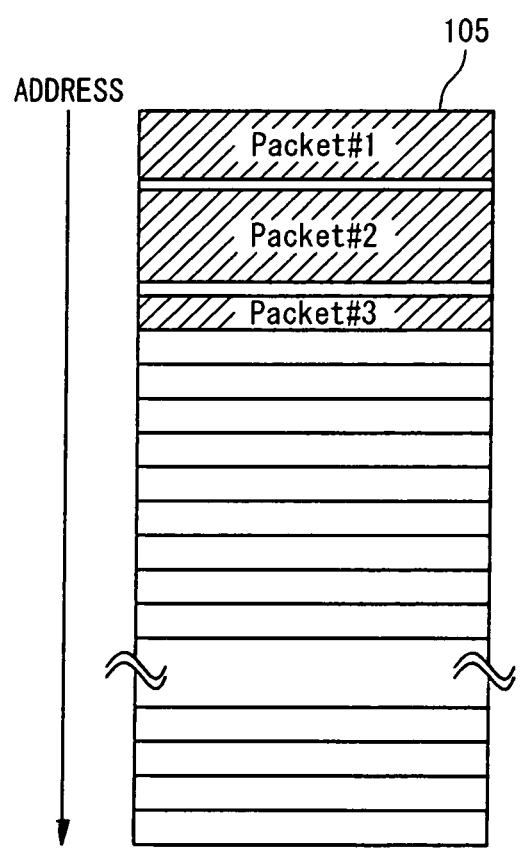
FIG. 6 is a conceptual diagram showing an example of a retransmission buffer in the first exemplary embodiment.

The retransmission buffer 105 is used for temporarily storing a transmission packet for the purpose of the packet retransmission in the lower layer. FIG. 6 is a conceptual diagram showing an example of the retransmission buffer 105. The retransmission buffer 105 is configured by using an existing method. For example, in FIG. 6, a buffer is divided into regions with a fixed length in advance, wherein a packet is stored so that the head of the packet always comes to the head of a region. In this case, information of a packet length is necessary. The information of the packet length may be stored in the packet information memory block 104 or may be set to the head of the packet when it is stored in the buffer.

The flow information memory block 103, the packet information memory block 104 and the retransmission buffer 105 are configured by a memory device such as a memory. In a case where the packet retransmission control block 10 is implemented by a reconfigurable hardware device such as an FPGA (Field-Programmable Gate Array), an internal memory included in the device may be used. It is also possible to use an SRAM (Static Random Access Memory), a DRAM (Dynamic Random Access Memory), a CAM (Content Addressable Memory) and the like.

The control block 101 performs the packet retransmission control in the MAC layer. Here, the retransmission timeout in the MAC layer as the lower layer is set to be shorter than the retransmission timeout in the TCP layer as the upper layer. That is, the control block 101 performs the packet retransmission control with a shorter retransmission timeout than that of the TCP. Moreover, the control block 101 determines, by referring to the duplicate ACK reception counter or the like, whether or not retransmission of a same packet is performed earlier in the TCP layer than in the MAC layer. If the retransmission of a same packet is performed earlier in the TCP layer than in the MAC layer, the control block 101 prohibits the retransmission of the same packet in the MAC layer and releases the same packet stored in the retransmission buffer 105.

More specifically, the control block 101 has a duplication determination block 1010 and a timeout control block 1011.

When a packet is transmitted, the timeout control block 1011 receives a copy of the transmission packet from the packet transmission block 102 and stores it in the retransmission buffer 105. Moreover, the timeout control block 1011 identifies a flow to which the transmission packet belongs, and checks, based on the flow identification information, whether the flow is being managed in the flow information memory block 103. If the flow is already being managed, the timeout control block 1011 updates the buffered packet count in the corresponding entry in the flow information memory block 103. If the flow is not managed yet, the timeout control block 1011 adds a new entry regarding the flow to the flow information memory block 103. Furthermore, the timeout control block 1011 adds a new entry regarding the packet to the packet information memory block 104, by using such information as an address value of the write destination in the retransmission buffer 105.

When a packet is received, the timeout control block 1011 and the duplication determination block 1010 receive such information as the type and the flow identification information of the received packet from the packet reception block 100.

If the received packet is an ACK packet in the MAC layer, the timeout control block 1011 releases a packet acknowledged by the ACK packet from the retransmission buffer 105. Moreover, the timeout control block 1011 updates the buffered packet count in the corresponding entry in the flow information memory block 103 and deletes the corresponding entry in the packet information memory block 104.

If the received packet is a NACK packet in the MAC layer, the timeout control block 1011 reads the associated packet from the retransmission buffer 105 and transmits the packet to the packet transmission block 102. Moreover, the timeout control block 1011 updates the entry information of the packet in the packet information memory block 104.

If the received packet is other than a control packet in the MAC layer, the timeout control block 1011 generates an ACK packet in the MAC layer responding to the received packet and transmits the generated ACK packet to the packet transmission block 102.

If the received packet is an ACK packet in the TCP layer, the duplication determination block 1010 updates the acknowledged sequence number and/or the duplicate ACK reception counter of the corresponding entry in the flow information memory block 103.

If it is notified that the received packet has an error, the timeout control block 1011 generates a NACK packet in the MAC layer responding to the received packet and transmits the generated NACK packet to the packet transmission block 102.

Furthermore, the timeout control block 1011 manages the timeout counter in the packet information memory block 104 and carries out timeout determination with respect to each of packets stored in the retransmission buffer 105. If the ACK packet or the NACK packet in the MAC layer is not sent back within a period specified by the RTO after transmission of a packet, the timeout control block 1011 determines that a timeout has occurred with regard to the packet and notifies the duplication determination block 1010 of the timeout occurrence.

When receiving the notification of the timeout occurrence, the duplication determination block 1010 refers to the duplicate ACK reception counter of the corresponding entry in the flow information memory block 103. Thereby, the duplication determination block 1010 determines whether or not retransmission of the packet in the MAC layer and retransmission of the same packet in the TCP layer are redundant. More specifically, if the duplicate ACK reception counter is equal to or more than a "predetermined number of times", the duplication determination block 1010 determines that "packet retransmission is redundant". Here, the "predetermined number of times" is the number of times of receiving the duplicate ACK packet which triggers the Fast Retransmit in the TCP layer, and typically three times. On the other hand, if the duplicate ACK reception counter is less than the above-mentioned predetermined number of times, the duplication determination block 1010 determines that "packet retransmission is not redundant". Then, the duplication determination block 1010 notifies the timeout control block 1011 of the determination result.

The timeout control block 1011 receives the determination result from the duplication determination block 1010. If it is determined that the packet retransmission is not redundant, the timeout control block 1011 performs retransmission of the packet. That is, the timeout control block 1011 refers to the retransmission buffer pointer of the corresponding entry in the packet information memory block 104 to read the packet stored in the retransmission buffer 105 and transmits the read packet to the packet transmission block 102.

On the other hand, if it is determined that the packet retransmission is redundant, the timeout control block 1011 cancels retransmission of the packet in the MAC layer and releases the packet stored in the retransmission buffer 105. Moreover, the timeout control block 1011 updates the buffered packet count of the corresponding entry in the flow information memory block 103 and also deletes the corresponding entry in the packet information memory block 104.

1-2. Processing Flow 1-2-1. Processing on Packet Transmission

Figure 7:
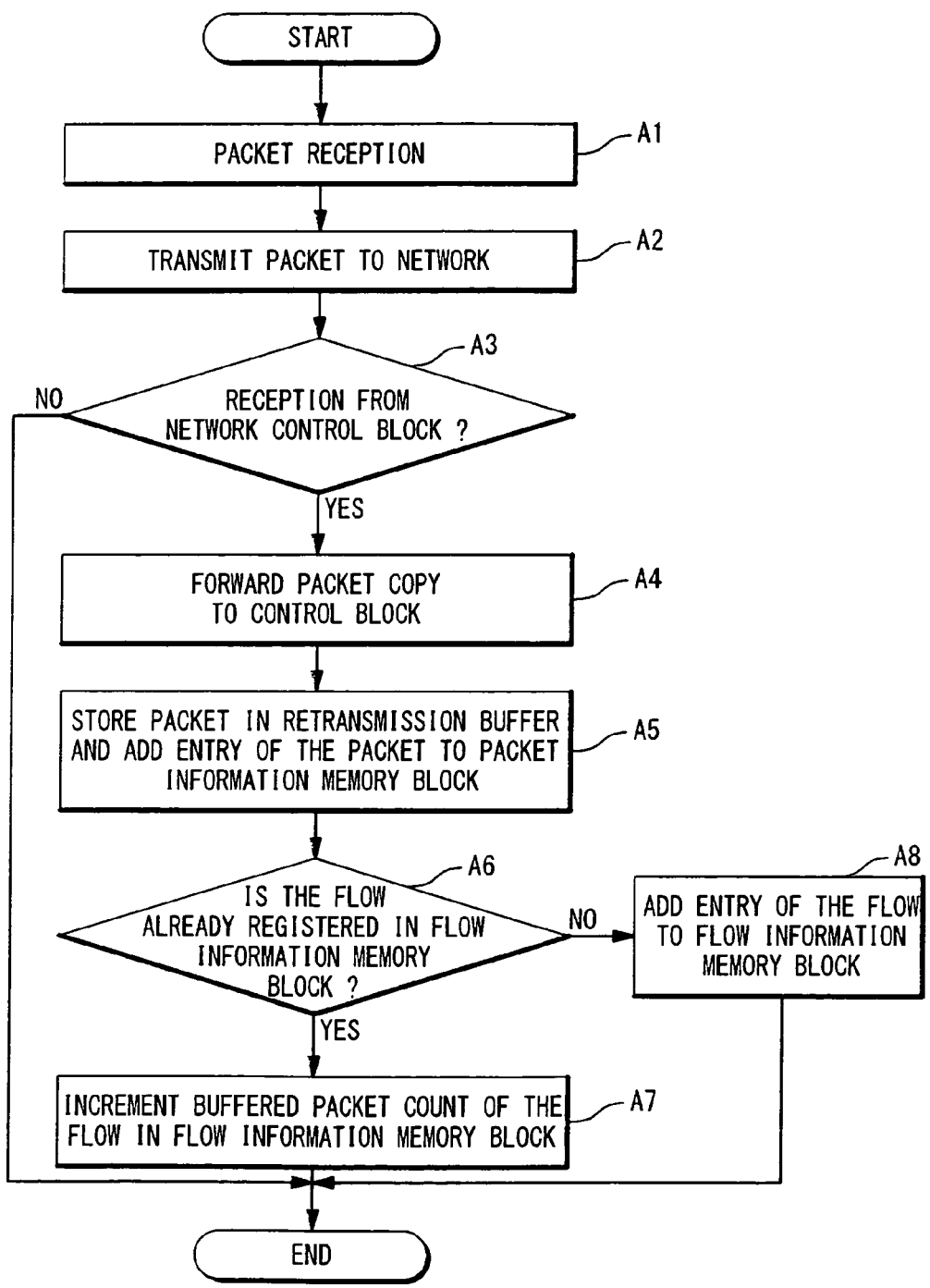
FIG. 7 is a flow chart showing processing carried out in packet transmission in the first exemplary embodiment.

FIG. 7 is a flow chart showing processing carried out in packet transmission in the present exemplary embodiment. When a packet is transmitted to a network by an application, the transmission packet is sent from the application processing block 20 to the packet retransmission control block 10 through the network control block 21. The packet transmission block 102 of the packet retransmission control block 10 receives the transmitted packet (Step A1).

The packet transmission block 102 sets a unique internal header of the MAC layer to the received transmission packet. The internal header includes such information as a unique sequence number required for the retransmission control in the MAC layer, and the information is indicated from the timeout control block 1011. Then, the packet transmission block 102 sends the transmission packet to the packet transmission/reception block 11. The packet transmission/reception block 11 transmits the transmission packet to the network (Step A2).

Also, the transmission packet at this time is one received from the network control block 21 (Step A3; Yes). In this case, the packet transmission block 102 sends a copy of the transmission packet to the control block 101 (Step A4). The timeout control block 1011 of the control block 101 receives the copy of the transmission packet from the packet transmission block 102 and stores it in the retransmission buffer 105.

Moreover, the timeout control block 1011 adds a new entry regarding the transmission packet to the packet information memory block 104, by using the flow identification information of the transmission packet, an address value of the writing destination in the retransmission buffer 105 and the like (Step A5).

Furthermore, the timeout control block 1011 checks whether or not an entry regarding a flow to which the transmission packet belongs is already registered on the flow information memory block 103 (Step A6). If it is already registered (Step A6; Yes), the timeout control block 1011 increases the buffered packet count in the corresponding entry in the flow information memory block 103 by one (Step A7). On the other hand, if it is not yet registered (Step A6; No), the timeout control block 1011 adds a new entry regarding the flow to the flow information memory block 103 (Step A8).

Note that, as will be described later, there are also cases where a control packet (ACK, NACK) in the MAC layer is transmitted or packet retransmission is performed. In these cases, the packet transmission block 102 receives the packet from the timeout control block 1011 (Step A1). The packet transmission block 102 sends the received packet to the packet transmission/reception block 11, and the packet transmission/reception block 11 transmits the received packet to the network (Step A2). The transmission packet at this time is not a packet received from the network control block 21 (Step A3; No). In this case, the packet transmission processing is completed without any further Steps.

1-2-2. Processing on Packet Reception

Figure 8:
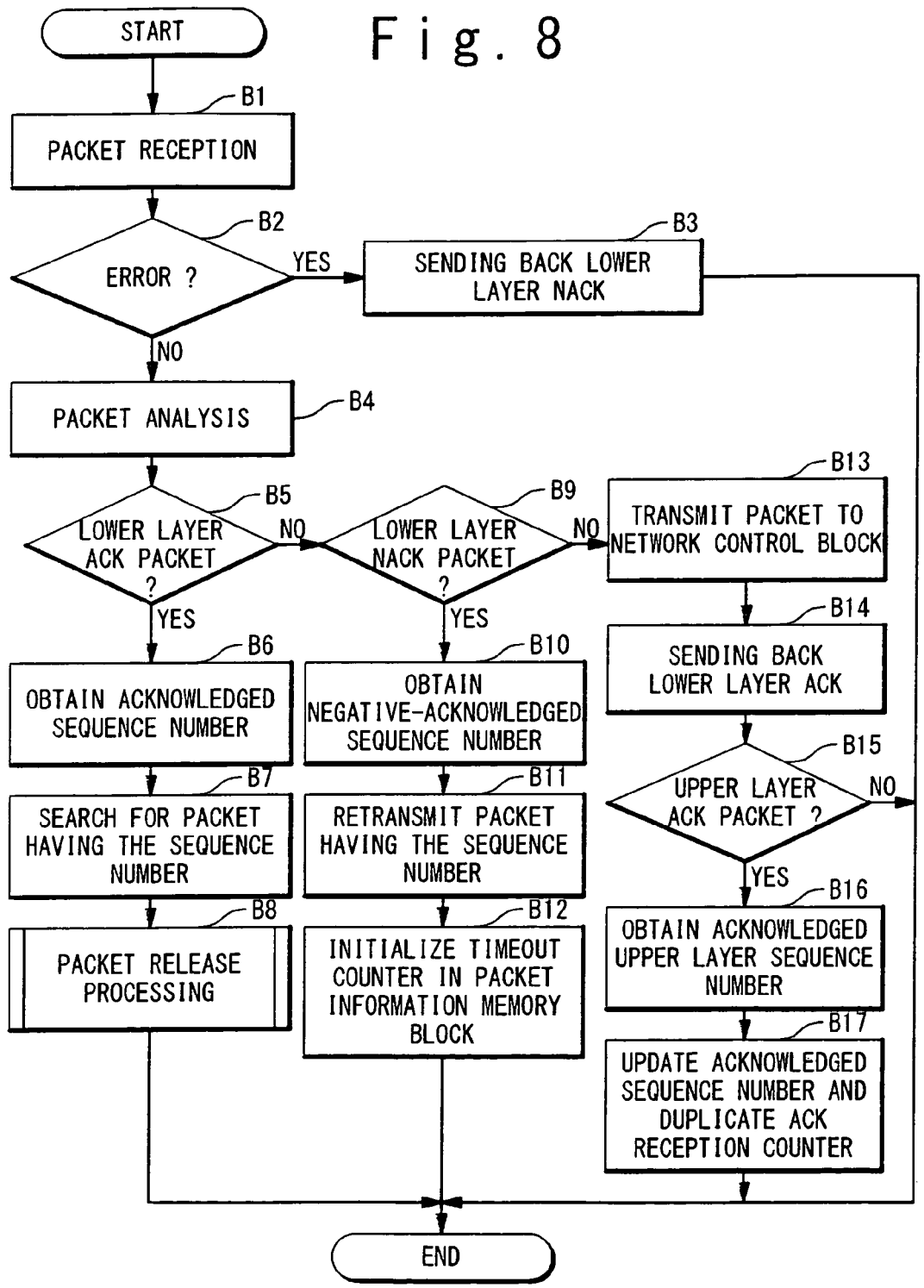
FIG. 8 is a flow chart showing processing carried out in packet reception in the first exemplary embodiment.

FIG. 8 is a flow chart showing processing carried out in packet reception in the present exemplary embodiment. The packet transmission/reception block 11 receives a packet from a network. The packet transmission/reception block 11 performs an error check with respect to the received packet and outputs to the packet retransmission control block 10 the received packet together with an error detection signal that indicates whether or not an error is included in the received packet. The packet reception block 100 of the packet retransmission control block 10 receives the received packet and the error detection signal (Step B1).

The packet reception block 100 refers to the error detection signal to check whether or not an error is included in the received packet (Step B2). If an error is included in the received packet (Step B2; Yes), the packet reception block 100 notifies the timeout control block 1011 in the control block 101 of the error. The timeout control block 1011 generates a NACK packet in the MAC layer responding to the received packet and sends the generated NACK packet to the packet transmission block 102 (Step B3). The NACK packet is sent from the packet transmission block 102 to the packet transmission/reception block 11 and sent back to the packet sender.

If no error is included in the received packet (Step B2; No), the packet reception block 100 analyzes the type of the received, packet based on the internal header information of the received packet (Step B4). Examples of the packet type include a control packet (ACK packet, NACK packet) in the MAC layer, an ACK packet in the TCP layer, and a normal data packet other than the above packets. The packet reception block 100 notifies the control block 101 of the type of the received packet along with other necessary information. Here, the necessary information includes the flow identification information of the received packet and the sequence number thereof in the MAC layer. If the received packet is a control packet in the MAC layer, the necessary information further includes a sequence number in the MAC layer which is acknowledged or negative-acknowledged by the control packet. If the received packet is an ACK packet in the TCP layer, the necessary information further includes a sequence number which is acknowledged by the ACK packet. Alternatively, the packet reception block 100 may extract header information of the received packet and send it to the control block 101.

The timeout control block 1011 and the duplication determination block 1010 of the control block 101 receive the information such as the type of the received packet and the flow identification information thereof. If the received packet is an ACK packet in the MAC layer (Step B5; Yes), the timeout control block 1011 obtains a sequence number which is acknowledged by the ACK packet (Step B6). The timeout control block 1011 searches the packet information memory block 104 for an entry indicating the sequence number in the MAC layer (Step B7). Then, the timeout control block 1011 carries out packet release processing (Step B8) with reference to a hit entry which was hit as a result of the search.

Figure 9:
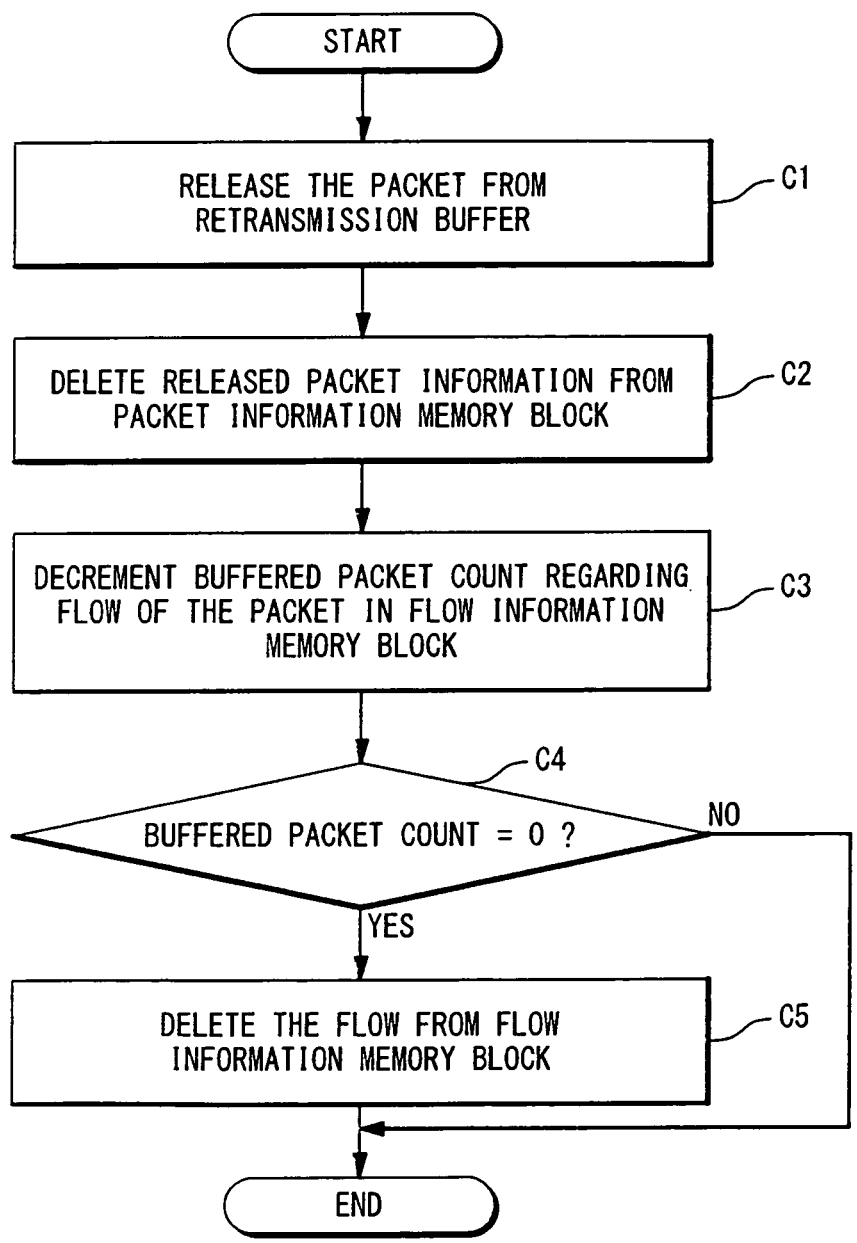
FIG. 9 is a flow chart showing packet release processing in the first exemplary embodiment.

FIG. 9 is a flow chart showing the packet release processing (Step B8) in the present exemplary embodiment. The timeout control block 1011 refers to the retransmission buffer pointer indicated by the hit entry to release the packet acknowledged by the received ACK packet from the retransmission buffer 105 (Step C1). Also, the timeout control block 1011 deletes the hit entry from the packet information memory block 104 (Step C2).

Moreover, the timeout control block 1011 searches the flow information memory block 103 for an entry regarding a flow of the received ACK packet, based on the flow identification information. Then, the timeout control block 1011 reduces the buffered packet count in the hit entry which was hit as a result of the search by 1 (Step C3). If the buffered packet count resultantly becomes 0 (Step C4; Yes), the timeout control block 1011 deletes the hit entry from the flow information memory block 103 (Step C5). In other cases (Step C4; No), the hit entry remains therein. In this manner, the packet release processing is carried out.

Referring back to FIG. 8 again, if the received packet is a NACK packet in the MAC layer (Step B5; No, Step B9; Yes), the timeout control block 1011 obtains a sequence number which is negative-acknowledged by the NACK packet (Step B10). Moreover, the timeout control block 1011 searches the packet information memory block 104 for an entry indicating the sequence number in the MAC layer. Then, the timeout control block 1011 refers to the retransmission buffer pointer indicated by the hit entry to read a packet negative-acknowledged by the NACK packet from the retransmission buffer 105 and send the read packet to the packet transmission block 102 (Step B11). In this manner, the packet is retransmitted. The timeout control block 1011 initializes the timeout counter indicated by the hit entry in the packet information memory block 104 (Step B12).

If the received packet is a packet other than the control packet in the MAC layer (Step B9; No), the packet reception block 100 removes the internal header from the received packet and then forwards the received packet to the network control block 21 (Step B13). Moreover, the timeout control block 1011 generates an ACK packet in an MAC layer responding to the received packet and sends the generated ACK packet to the packet transmission block 102 (Step B14). The ACK packet is sent from the packet transmission block 102 to the packet transmission/reception block 11 and sent back to the packet sender.

Meanwhile, the duplication determination block 1010 checks whether or not the received packet is an ACK packet in the TCP layer (Step B15). If the received packet is an ACK packet in the TCP layer (Step B15; Yes), the duplication determination block 1010 obtains the sequence number of the TCP (referred to as a "latest sequence number" hereinafter) which is acknowledged by the ACK packet (Step B16). Also, the duplication determination block 1010 searches the flow information memory block 103 for an entry regarding a flow of the received ACK packet, based on the flow identification information. Then, the duplication determination block 1010 updates the acknowledged sequence number and/or the duplicate ACK reception counter in a hit entry which was hit as a result of the search (Step B17).

Details of the Step B17 are as follows. First, the duplication determination block 1010 compares the latest sequence number obtained in the above Step B16 with the acknowledged sequence number indicated by the hit entry. If the latest sequence number is equal to the acknowledged sequence number, it means that the ACK packet received this time is a duplicate ACK packet in the TCP layer and the duplicate ACK packet is to be forwarded from the packet retransmission control block 10 to the network control block 21 in the upper layer. Therefore, the duplication determination block 1010 increases (increments) the duplicate ACK reception counter in the hit entry by 1. On the other hand, if the latest sequence number is newer than the acknowledged sequence number, the duplication determination block 1010 updates the acknowledged sequence number in the hit entry to the latest sequence number, and also initializes the duplicate ACK reception counter in the hit entry to 0. Note that, if the latest sequence number is older than the acknowledged sequence number, it means that the packet arriving order is exchanged. In this case, the duplication determination block 1010 does not perform anything special.

It should be noted that the above-mentioned Step B13 and Step B14 may be carried out in parallel, because the Step B13 is processing carried out by the packet reception block 100 and the Step B14 is processing carried out by the timeout control block 1011. Moreover, the above-mentioned Step B14 and Steps B15 to B17 may be carried out in parallel, because the Step B14 is processing carried out by the timeout control block 1011 and the Steps B15 to B17 are processing carried out by the duplication determination block 1010.

1-2-3. Processing on Occurrence of Timeout

Figure 10:
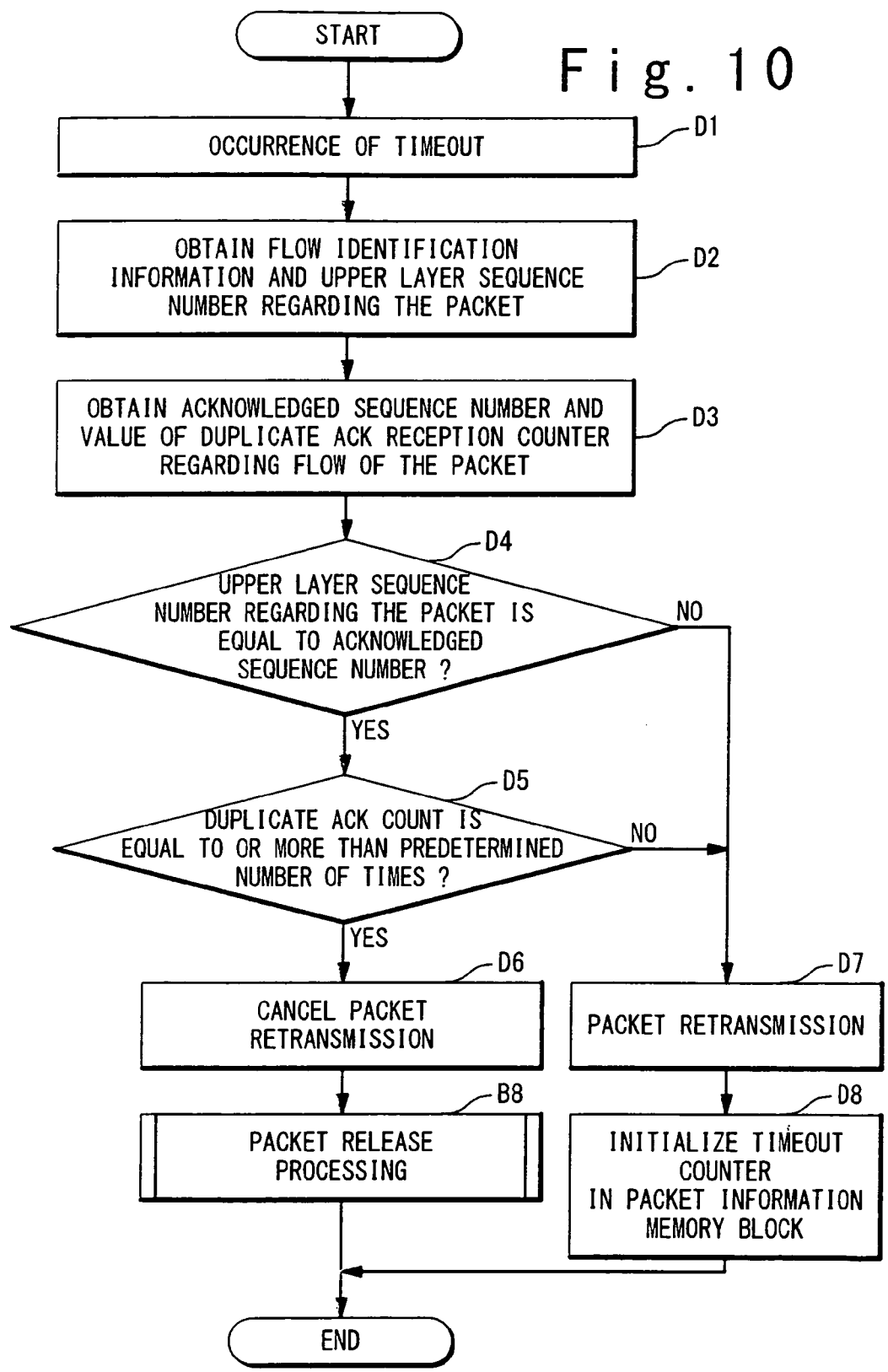
FIG. 10 is a flow chart showing processing carried out when a timeout occurs in the first exemplary embodiment.

FIG. 10 is a flow chart showing processing carried out when a timeout regarding a packet occurs in the MAC layer. Since determination of timeout is well known by those who are skilled in the art, detailed explanation thereof will be omitted. In the present exemplary embodiment, the timeout control block 1011 uses such information as the timeout counter and the time stamp managed by the packet information memory block 104 to perform the timeout determination with respect to each packet stored in the retransmission packet 105. If timeout is detected regarding a packet, an address value to an entry regarding the packet in the packet information memory block 104 (which is referred to as a "retransmission packet entry" hereinafter) is already known.

Timeout regarding a packet (retransmission target packet) occurs in the MAC layer (Step D1). The timeout control block 1011 notifies the duplication determination block 1010 of the occurrence of timeout along with the address value to the retransmission packet entry. The duplication determination block 1010 obtains the flow identification information and the sequence number in the TCP layer which are indicated by the retransmission packet entry stored in the packet information memory block 104 (Step D2). Furthermore, the duplication determination block 1010 searches the flow information memory block 103 for an entry indicating the flow identification information and obtains the acknowledged sequence number and the duplicate ACK reception counter indicated by the hit entry (Step D3).

The duplication determination block 1010 compares the sequence number obtained in the above-mentioned Step D2 with the acknowledged sequence number obtained in the above-mentioned Step D3 (Step D4). If the sequence number is not equal to the acknowledged sequence number (Step D4; No), the retransmission target packet is a packet which should be retransmitted. Accordingly, the duplication determination block 1010 instructs the timeout control block 1011 to carry out the "packet retransmission".

On the other hand, if the sequence number is equal to the acknowledged sequence number (Step D4; Yes), the duplication determination block 1010 refers to the duplicate ACK reception counter indicated by the hit entry stored in the flow information memory block 103 (Step D5). If the duplicate ACK reception counter is less than a "predetermined number of times (which is typically three times)" (Step D5; No), the duplication determination block 1010 determines that "packet retransmission is not redundant" and instructs the timeout control block 1011 to carry out the "packet retransmission". On the other hand, if the duplicate ACK reception counter is equal to or more than the "predetermined number of times" (Step D5; Yes), the duplication determination block 1010 determines that "packet retransmission is redundant" and instructs the timeout control block 1011 to "cancel packet retransmission".

If "cancel packet retransmission" is instructed, the timeout control block 1011 cancels retransmission of the retransmission target packet in the MAC layer (Step D6). Then, the timeout control block 1011 executes the above-described packet release processing (Step B8) shown in FIG. 9 with respect to the retransmission target packet.

On the other hand, if "packet retransmission" is instructed, the timeout control block 1011 executes retransmission of the retransmission target packet (Step D7). That is, the timeout control block 1011 refers to the retransmission buffer pointer indicated by the retransmission packet entry stored in the packet information memory block 104 to read the retransmission target packet stored in the retransmission buffer 105 and transmits the packet to the packet transmission block 102. Moreover, the timeout control block 1011 initializes the timeout counter indicated by the retransmission packet entry (Step D8).

1-3. Effects

According to the present exemplary embodiment, as described above, in response to the occurrence of timeout in the MAC layer, the packet retransmission control block 10 refers to the duplicate ACK reception counter regarding a flow to which the retransmission target packet belongs. If the duplicate ACK reception counter is equal to or more than a predetermined number of times, the Fast Retransmit for the same packet is considered to be activated or already activated in the upper TCP layer. Therefore, the packet retransmission control block 10 cancels the packet retransmission due to timeout in the MAC layer. As a result, it is prevented that retransmission of the same packet is duplicated. This leads to suppression of wasting of a network bandwidth.

Moreover, execution/cancellation of the packet retransmission in the MAC layer is determined by the packet retransmission control block 10 in the MAC layer, and information (e.g. duplicate ACK reception counter) required for the determination processing is entirely managed in the packet retransmission control block 10. It is therefore possible to obtain the above-mentioned effects without changing functions of the upper layer such as the TCP layer.

The present exemplary embodiment can be applied to a high-bandwidth and low-delay network such as, for example, a network in a data center.

1-4. Modification Example

In the above description, the unique internal header used in the MAC layer is set to a packet. However, the unique internal header in the MAC layer may not be set to a packet. Information such as the sequence number in the TCP header may be used for the retransmission control in the MAC layer without making any changes.

In the above description, an ACK packet and a NACK packet are sent back in the MAC layer. However, only an ACK packet may be sent back when a packet is received correctly.

In the above description, the packet transmission/reception block 11 is provided with a function of a data link layer such as the MAC layer, in addition to a physical layer. However, the function of the data link layer such as the MAC layer may be provided in the packet retransmission control block 10. In this case, the function of the data link layer is added appropriately to the packet reception block 100, the control block 101 and the packet transmission block 102, while the packet transmission/reception block 11 is provided with only a function of a physical layer.

In the above description, the upper layer which performs the packet retransmission control is the TCP layer and the lower layer which performs the packet retransmission control is the MAC layer, but they are not limited to that. It is also possible to employ a protocol which has a packet retransmission control function similar to that of the TCP as an upper layer protocol and a protocol which performs the packet retransmission control in the layer lower as a target.

In the above description, the "predetermined number of times" used as a reference to determine the cancellation of the packet retransmission is three times, but it is not limited. The predetermined number of times can be appropriately set and changed depending on protocol setting in the upper layer.

In a case of UDP (User Datagram Protocol) which does not have the retransmission control in the upper layer, the acknowledged sequence number and the duplicate ACK reception counter or the like stored in the flow information memory block 103 are set to an indeterminate value (or don't care).

2. Second Exemplary Embodiment

In the first exemplary embodiment, it is the "occurrence of timeout in the MAC layer" that triggers the packet retransmission control block 10 to refer to the duplicate ACK reception counter and execute the packet release processing as necessary. In a second exemplary embodiment, the trigger is that "the packet retransmission control block 10 forwards an ACK packet in the TCP layer to the network control block 21". That is, in the second exemplary embodiment, when an ACK packet in the upper layer is forwarded to the upper layer, the packet retransmission control block 10 refers to the duplicate ACK reception counter and performs the packet release processing depending on the case.

A configuration in the second exemplary embodiment is similar to the configuration in the first exemplary embodiment (refer to Section 1-1 and FIGS. 2 to 6), and an overlapping description will be omitted as appropriate.

The processing carried out in the packet transmission is the same as in the case of the first exemplary embodiment (refer to Section 1-2-1 and FIG. 7).

Figure 11:
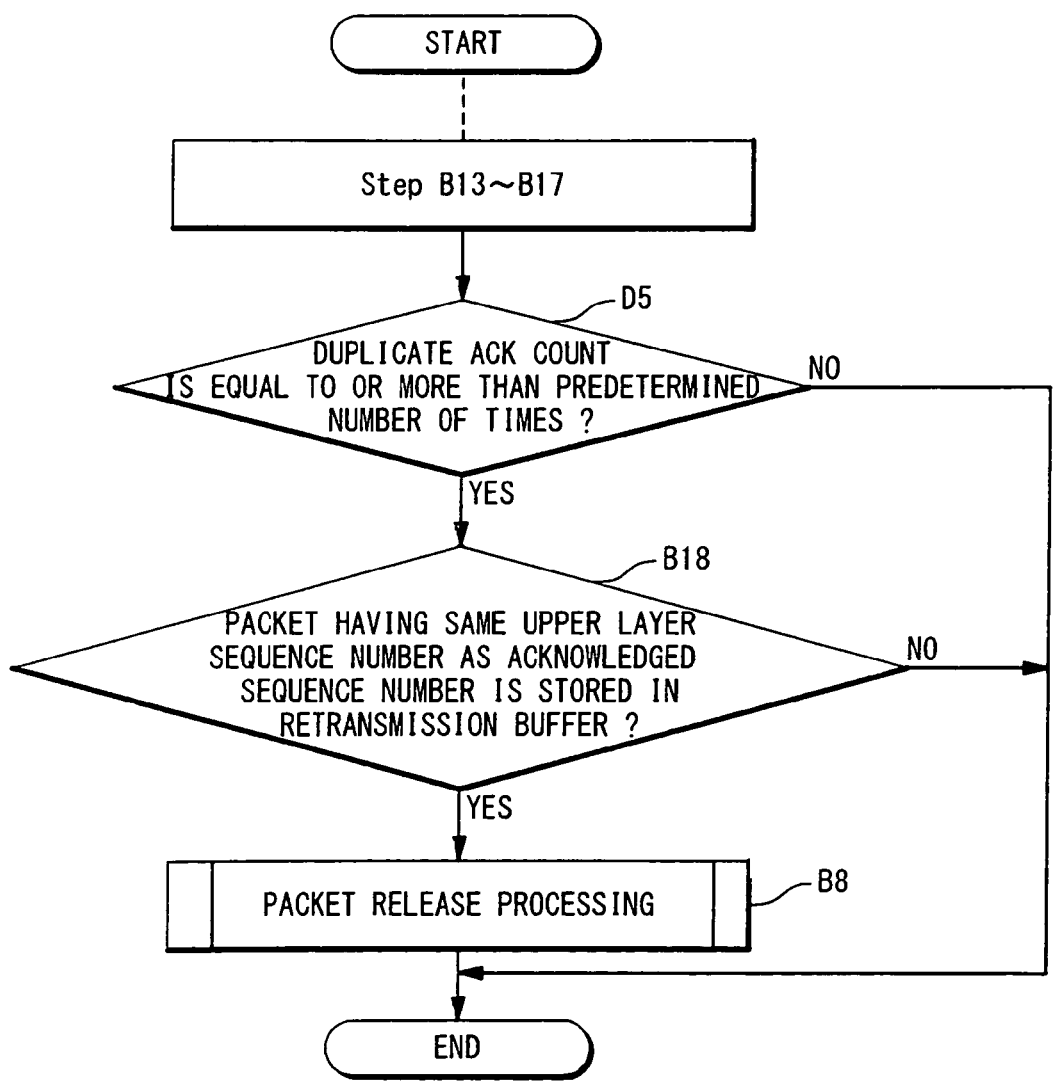
FIG. 11 is a flow chart showing processing carried out in packet reception in a second exemplary embodiment of the present invention.

FIG. 11 is a flow chart showing processing carried out in packet reception in the present exemplary embodiment. Steps B1 to B12 are the same as in the case of the first exemplary embodiment. Also, if the received packet is an ACK packet in the TCP layer, Steps B13 to B17 are executed as in the case of the first exemplary embodiment. According to the present exemplary embodiment, the following processing is further executed after the Step B17.

After the duplicate ACK reception counter is updated in the Step B17, the duplication determination block 1010 refers to the post-update duplicate ACK reception counter (Step D5). If the post-update duplicate ACK reception counter is less than a "predetermined number of times (which is typically three times)" (Step D5; No), the packet reception processing is completed without any further Steps.

On the other hand, if the post-update duplicate ACK reception counter is equal to or more than the "predetermined number of times" (Step D5; Yes), the duplication determination block 1010 obtains the acknowledged sequence number indicated by the hit entry in the flow information memory block 103. Then, the duplication determination block 1010 searches the packet information memory block 104 for an entry which indicates the "upper layer sequence number" equal to the acknowledged sequence number. That is, the duplication determination block 1010 checks whether or not a packet having the "upper layer sequence number" equal to the acknowledged sequence number is stored in the retransmission buffer 105 (Step B18).

If such a packet is stored in the retransmission buffer 105 (Step B18; Yes), the duplication determination block 1010 determines that "packet retransmission will become redundant when timeout occurs in the MAC layer in the future". Therefore, the duplication determination block 1010 prohibits retransmission of the packet in the MAC layer. More specifically, the duplication determination block 1010 instructs the timeout control block 1011 to "release the packet in advance" in order to avoid retransmission of the packet in the MAC layer. In response to the instruction, the timeout control block 1011 performs the above-mentioned packet release processing (Step B8) shown in FIG. 9 with respect to the packet.

On the other hand, if such a packet is not stored in the retransmission buffer 105 (Step B18; No), there is no possibility that the packet retransmission becomes redundant. Therefore, the packet reception processing is completed without any further Steps.

Figure 12:
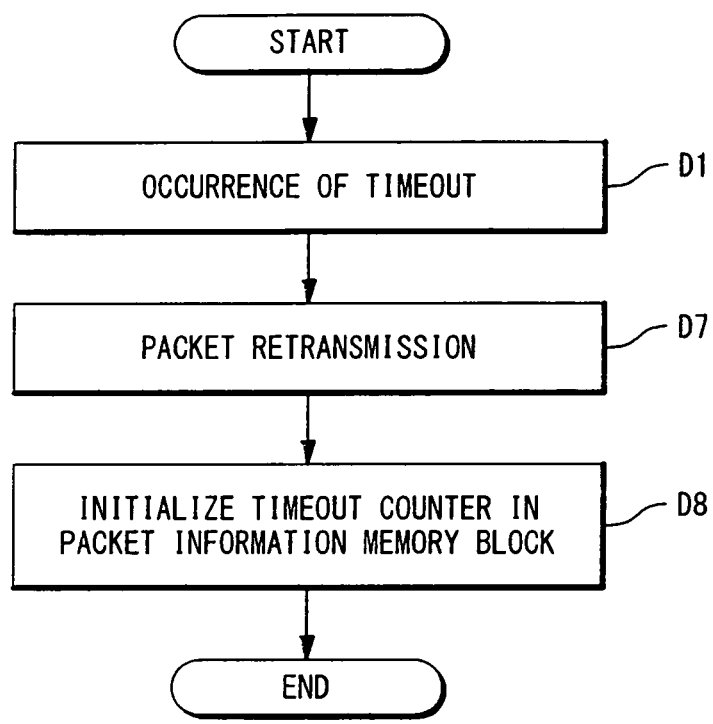
FIG. 12 is a flow chart showing processing carried out when a timeout occurs in the second exemplary embodiment.

FIG. 12 is a flow chart showing processing carried out when timeout occurs in the present exemplary embodiment. In the present exemplary embodiment, as described above, the packet release processing is executed in advance as appropriate at the time of packet reception. Therefore, when the timeout is occurred in the MAC layer, there is no need to determine whether to execute or cancel the packet retransmission and to carry out the packet release processing. As compared with the flow in the first exemplary embodiment as shown in FIG. 10, the Steps D2 to D6 and the packet release processing (Step B8) are omitted. The other Steps D1, D7 and D8 are the same as in the case of the first exemplary embodiment.

According to the second exemplary embodiment, as described above, the post-update duplicate ACK reception counter is referred to when an ACK packet in the upper layer is received. As a result, if the duplicate ACK reception counter reaches the predetermined number of times (which is typically three times), the packet release processing in the lower layer is carried out at that point. This also can prevent the duplication of retransmission of the same packet. This leads to suppression of wasting of a network bandwidth. Moreover, as in the case of the first exemplary embodiment, there is no need to change the functions of the upper layer such as the TCP layer.

If the Fast Retransmit in the TCP layer is activated before timeout in the MAC layer occurs, the retransmission packet by the Fast Retransmit also is stored in the retransmission buffer 105. In the case of the foregoing first exemplary embodiment, since it is before the occurrence of timeout in the MAC layer, the same packet as the retransmission packet is already stored in the retransmission buffer 105 and resultantly two identical packets are to be stored in the retransmission buffer 105. This means inefficient use of the retransmission buffer 105. On the other hand, in the case of the second exemplary embodiment, the same packet already stored is released at the time when the duplicate ACK reception counter becomes three, namely, at the time when the Fast Retransmit in the TCP layer is activated. Accordingly, the retransmission buffer 105 can be used efficiently.

The modification example as described in the first exemplary embodiment also is applicable.

3. Third Exemplary Embodiment 3-1. Configuration

In a third exemplary embodiment, the configurations of the flow information memory block 103 and the packet information memory block 104 are different from those in the foregoing exemplary embodiments. An overlapping description with the foregoing exemplary embodiments will be omitted as appropriate.

Figure 13:
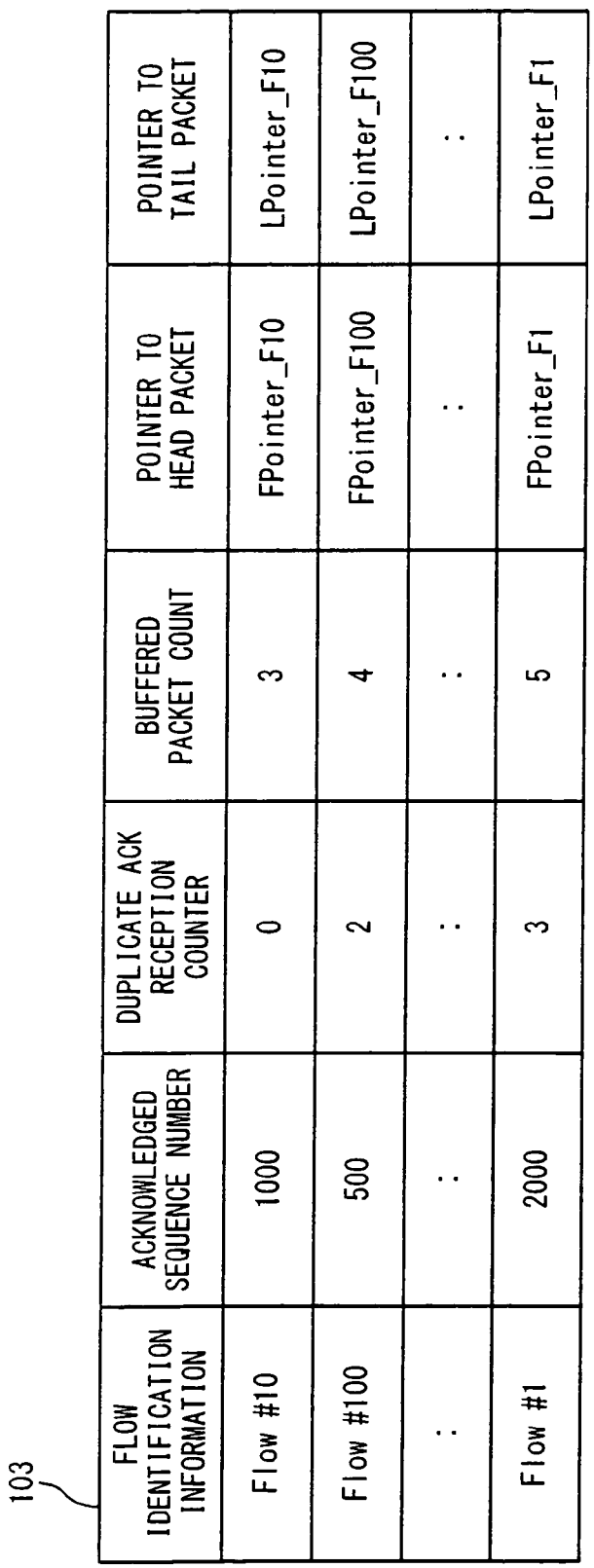
FIG. 13 is a conceptual diagram showing an example of a flow information memory block in a third exemplary embodiment of the present invention.

FIG. 13 is a conceptual diagram showing an example of the flow information memory block 103 in the third exemplary embodiment. As shown in FIG. 13, each entry in the flow information memory block 103 includes a "pointer to a head packet" and a "pointer to a tail packet" in addition to the information shown in the foregoing FIG. 4. The head packet is a packet that is stored earliest among packets of the corresponding flow stored in the retransmission buffer 105. That is, the head packet is a packet for which timeout can occur earliest among packets of the corresponding flow. The "pointer to the head packet" is a pointer (such as address value) to a packet entry regarding the head packet in the packet information memory block 104. Meanwhile, the tail packet is a packet that is stored latest among packets of the corresponding flow stored in the retransmission buffer 105. That is, the tail packet is a packet for which timeout can occur latest among packets of the corresponding flow. The "pointer to the tail packet" is a pointer (such as address value) to a packet entry regarding the tail packet in the packet information memory block 104.

FIG. 14 is a conceptual diagram showing an example of the packet information memory block 104 in the third exemplary embodiment. As shown in FIG. 14, each entry in the packet information memory block 104 includes a "bidirectional list creating pointer" in addition to the information shown in the foregoing FIG. 5. The bidirectional list creating pointer is a pointer for creating a bidirectional list in the order from the head packet with respect to packets which belong to the same flow as the corresponding packet, and is a pointer (such as address value) to each packet entry in the packet information memory block 104. The bidirectional list in the order from the head packet means a bidirectional list in which packets are arranged in the order of stored time beginning from the head packet. In FIG. 14, the bidirectional list creating pointer is expressed as (<pointer to a packet entry regarding a previous packet in the bidirectional list>, <pointer to a packet entry regarding a next packet in the bidirectional list>.

3-2. Processing Flow
3-2-1. Processing on Packet Transmission

Figure 15:
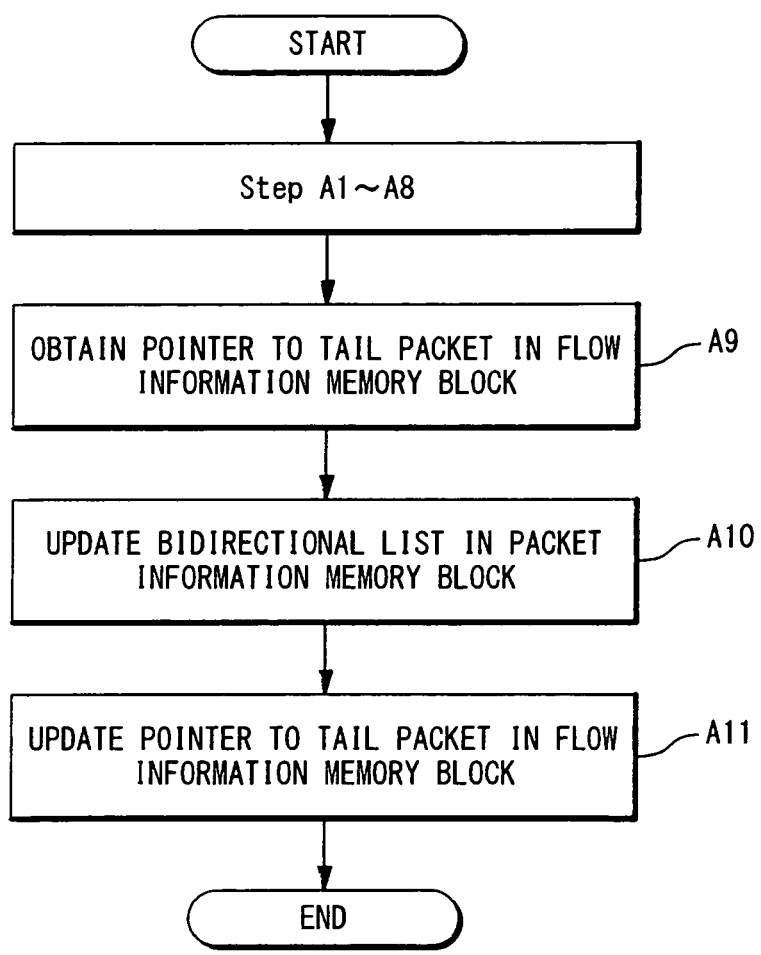
FIG. 15 is a flow chart showing processing carried out in packet transmission in the third exemplary embodiment.

FIG. 15 is a flow chart showing processing carried out in packet transmission in the present exemplary embodiment. The Steps A1 to A8 are the same as in the case of the first exemplary embodiment (refer to Section 1-2-1 and FIG. 7). In the Step A5, as described above, a transmission packet which belongs to a flow is newly stored in the retransmission buffer 105 and a new packet entry regarding the transmission packet is added to the packet information memory block 104. Also, in the Step A7 or A8, a flow entry regarding the corresponding flow in the flow information memory block 103 is updated or newly created. Thereafter, the following processing is further executed.

The timeout control block 1011 refers to the flow entry regarding the corresponding flow in the flow information memory block 103 to obtain the "pointer to the tail packet" indicated by the flow entry (Step A9).

Next, the timeout control block 1011 updates the bidirectional list creating pointer in the packet information memory block 104 (Step A10). More specifically, the timeout control block 1011 sets the bidirectional list creating pointer in a new packet entry regarding the transmission packet to (<"pointer to the tail packet" obtained in the Step A9>, <NULL>). Moreover, the timeout control block 1011 changes the bidirectional list creating pointer in the entry regarding the tail packet obtained in the Step A9 to (<the same one as the previous one>, <pointer to the new packet entry regarding the transmission packet>).

After that, the timeout control block 1011 updates the "pointer to the tail packet" indicated by the flow entry in the flow information memory block 103 (Step A11). More specifically, the "pointer to the tail packet" is changed to a "pointer to the new packet entry regarding the transmission packet".

3-2-2. Processing on Packet Reception

Figure 16:
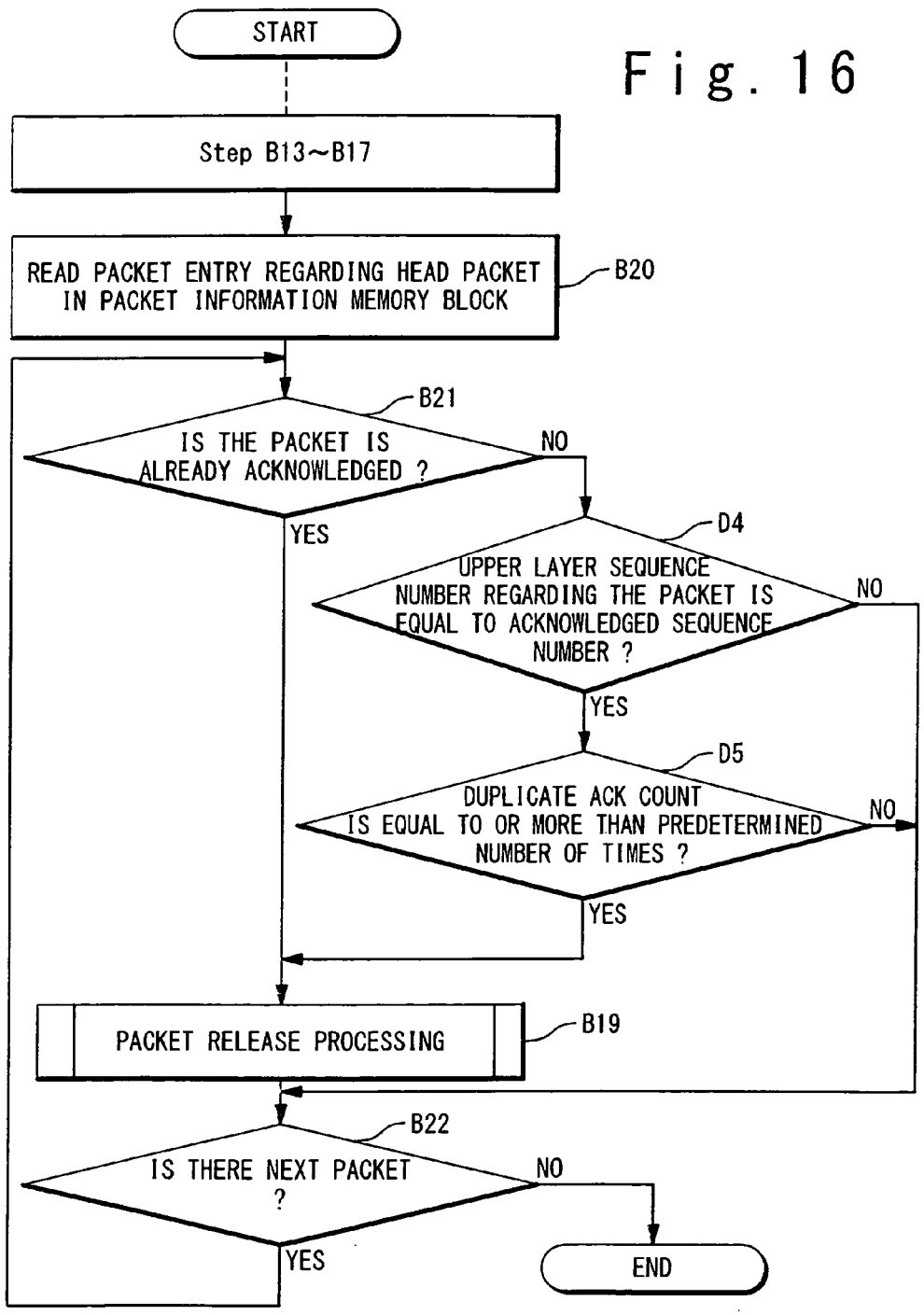
FIG. 16 is a flow chart showing processing carried out in packet reception in the third exemplary embodiment.

FIG. 16 is a flow chart showing processing in packet reception in the present exemplary embodiment. The Steps B1 to B12 are the same as in the case of the first exemplary embodiment. Moreover, if the received packet is an ACK packet in the TCP layer, the Steps B13 to B17 are executed as in the case of the first exemplary embodiment. According to the present exemplary embodiment, the following processing is further executed after the Step B17.

The duplication determination block 1010 obtains the "pointer to the head packet" indicated by the hit entry in the flow information memory block 103. Then, the duplication determination block 1010 uses the "pointer to the head packet" to read a packet entry regarding the head packet in the packet information memory block 104 (Step B20).

The duplication determination block 1010 checks whether or not a packet corresponding to the read packet entry is already acknowledged (Step B21). More specifically, the duplication determination block 1010 compares the "upper layer sequence number" indicated by the read packet entry and the "acknowledged sequence number" indicated by the hit entry in the flow information memory block 103 and thereby checks whether or not it is already acknowledged. If the packet is already acknowledged (Step B21; Yes), the packet release processing (Step B19) for the packet is carried out.

On the other hand, if the packet is not acknowledged yet (Step B21; No), the duplication determination block 1010 checks whether or not the "upper layer sequence number" of the packet is equal to the "acknowledged sequence number" (Step D4). If the sequence number is not equal to the acknowledged sequence number (Step D4; No), the processing proceeds to Step B22. On the other hand, if the sequence number and the acknowledged sequence number are equal to each other (Step D4; Yes), the duplication determination block 1010 refers to the duplicate ACK reception counter indicated by the hit entry in the flow information memory block 103 (Step D5). If the duplicate ACK reception counter is less than a "predetermined number of times (which is typically three times)" (Step D5; No), the processing proceeds to the Step B22. If the duplicate ACK reception counter is equal to or more than the "predetermined number of times" (Step D5; Yes), the packet release processing (Step B19) for the packet is carried out.

In the Step B22, the duplication determination block 1010 refers to <pointer to a packet entry regarding the next packet in the bidirectional list> which is included in the packet entry read from the packet information memory block 103. If the pointer is <NULL>, there is no next packet in the bidirectional list (Step B22; No). In this case, the packet reception processing is finished. In other cases, there is the next packet in the bidirectional list (Step B22; Yes). In this case, the duplication determination block 1010 uses the pointer to read a packet entry regarding the next packet in the packet information memory block 104. Then, the processing returns back to the above-mentioned Step B21 and a similar processing is repeated with regard to the read packet entry.

In this manner, according to the present exemplary embodiment, if the received packet is an ACK packet in the TCP layer, whether or not the packet release processing is appropriate is determined in the order from the head packet to the tail packet of the corresponding flow. If the packet release processing is appropriate, the packet release processing for the packet is carried out (Step B19).

Figure 17:
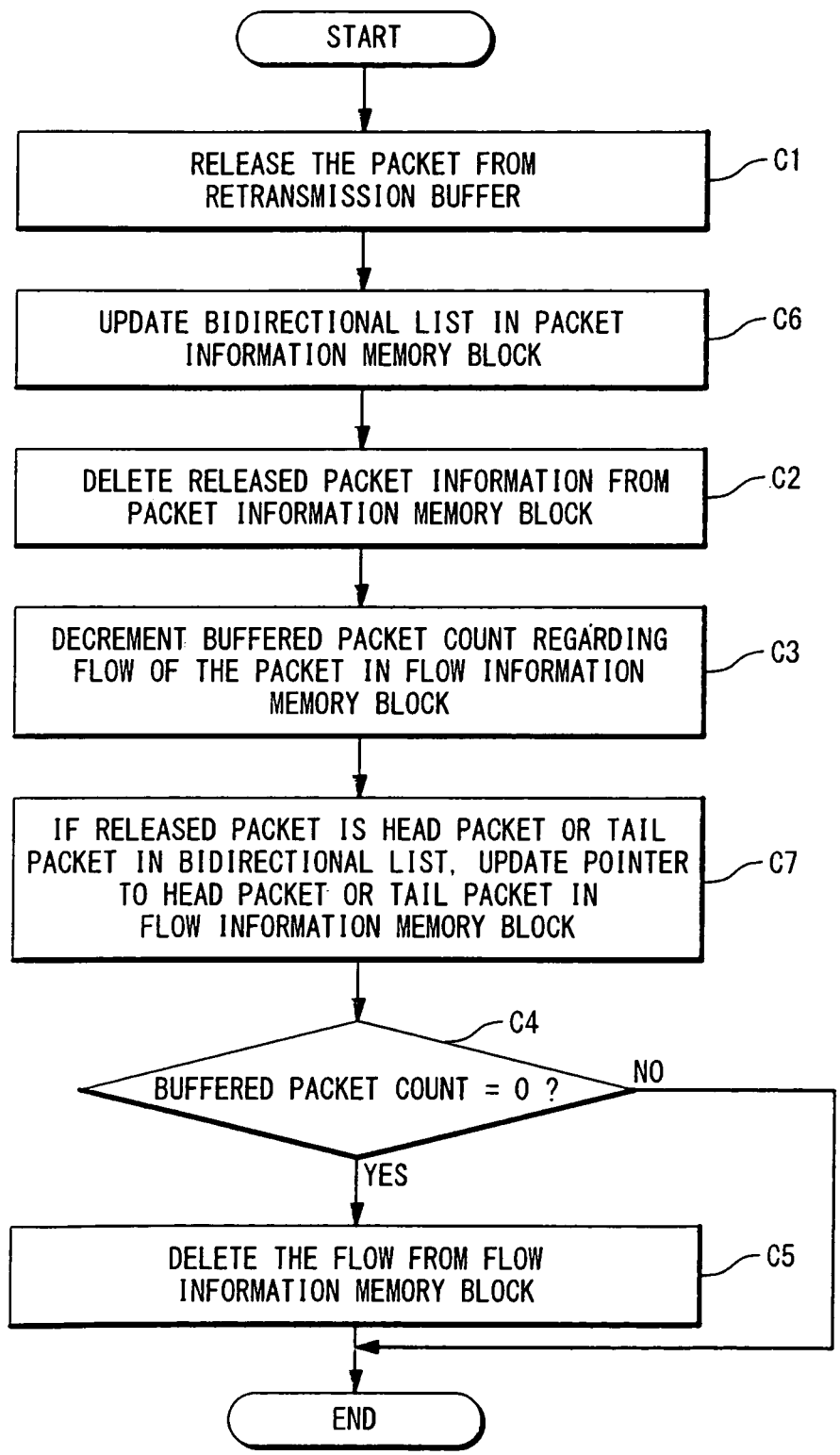
FIG. 17 is a flow chart showing packet release processing in the third exemplary embodiment.

FIG. 17 is a flow chart showing the packet release processing (Step B19) in the present exemplary embodiment. As compared with the packet release processing (Step B8) shown in the foregoing FIG. 9, Step C6 is added between the Steps C1 and C2, and Step C7 is added between the Steps C3 and C4 in the present exemplary embodiment. The other Steps are the same as in the cases of the foregoing exemplary embodiments.

In the Step C6, the bidirectional list is updated before a packet entry regarding the released packet is deleted from the packet information memory block 104. More specifically, the timeout control block 1011 refers to the bidirectional list pointer of the corresponding packet entry to read a packet entry regarding the previous packet. Then, the timeout control block 1011 changes the bidirectional list creating pointer in the packet entry regarding the previous packet to (<the same one as the previous one>, <pointer to the next packet in the bidirectional list pointer of the packet entry>). Moreover, the timeout control block 1011 refers to the bidirectional list pointer in the packet entry to read a packet entry regarding the next packet. Then, the timeout control block 1011 changes the bidirectional list creating pointer in the packet entry regarding the next packet to (<pointer to the previous packet in the bidirectional list pointer of the packet entry>, <the same one as the previous one>).

In the Step C7, the "pointer to the head packet" or the "pointer to the tail packet" in the flow information memory block 103 is updated, as necessary. More specifically, if the released packet is the head packet, the timeout control block 1011 updates the "pointer to the head packet" in the flow information memory block 103 to the <pointer to the next packet in the bidirectional list pointer of the packet entry> obtained in the Step C6. Also, if the released packet is the tail packet, the timeout control block 1011 updates the "pointer to the tail packet" in the flow information memory block 103 to the <pointer to the previous packet in the bidirectional list pointer of the packet entry> obtained in the Step C6.

3-2-3. Processing on Occurrence of Timeout

Processing carried out when timeout occurs is the same as that in the second exemplary embodiment (refer to FIG. 12).

3-3. Effects

According to the third exemplary embodiment, processing similar to that in the second exemplary embodiment can be achieved and effects as in the case of the second exemplary embodiment can be obtained. Furthermore, the following effects can also be obtained.

Let us consider a case where a control packet (ACK, NACK) in the MAC layer is lost in a network due to some reasons. In this case, there is a possibility that, even though a packet is received by the receiver, the sender cannot receive the control packet in the MAC layer and consequently the packet retransmission due to timeout is caused. According to the present exemplary embodiment, when an ACK packet in the TCP is received, a packet which is already acknowledged in the TCP is also released. That is, at the point when acknowledgement in the TCP is confirmed, the corresponding packet is released from the retransmission buffer 105. It is therefore possible to use the retransmission buffer 105 more efficiently.

3-4. Modification Example

The modification example described in the first exemplary embodiment also is applicable.

In the above description, both of the head packet and the tail packet of the bidirectional list are managed in the flow information memory block 103. However, only one of the head packet and the tail packet may be managed. On accessing a packet entry, the bidirectional list is traced from the head or the tail.

Also, in the case of "Step D4; No" or "Step D5; No" in FIG. 16, the packet reception processing may be finished without proceeding to the Step B22. The reason is that it is highly possible that packets subsequent to a packet that is not yet acknowledged also are not acknowledged. In this case, the processing speed can be increased.

4. Other Configuration Examples

Figure 18:
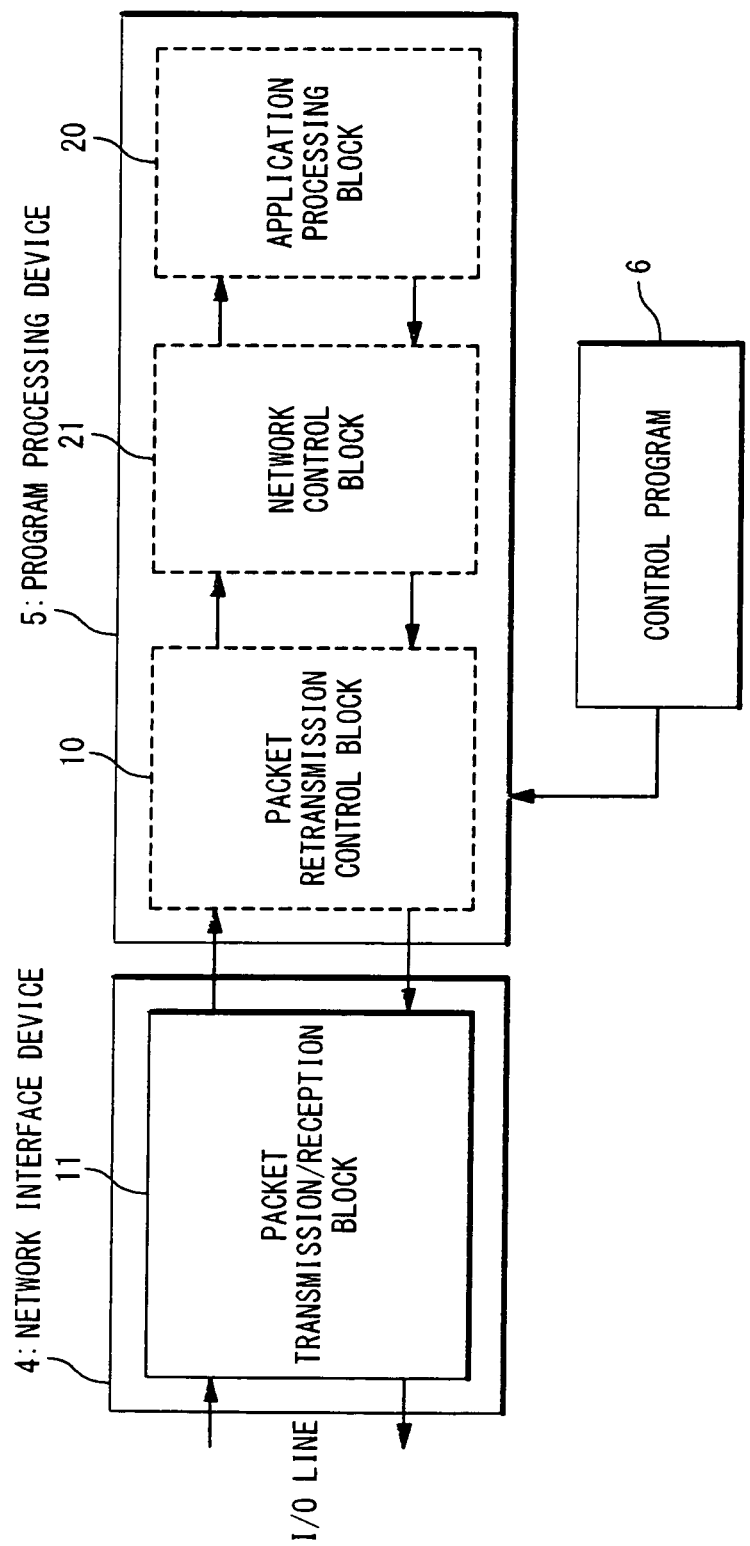
FIG. 18 is a block diagram showing another exemplary embodiment of the present invention.

FIG. 18 shows another configuration example of the packet retransmission control system. In FIG. 18, the packet retransmission control system has a network interface device 4, a program processing device 5 and a control program 6. The network interface device 4 is, for example, a NIC installed on a server as an extension card or an on-board card. The program processing device 5 is achieved by a CPU of a host, such as a server and a PC, and so on. In the present example, the network interface device 4 has the packet transmission/reception block 11, and the program processing device 5 has the packet retransmission control block 10, the network control block 21 and the application processing block 20. The function of each block is the same as in the case of the foregoing exemplary embodiments.

The control program 6 is a computer program executed by the program processing device 5 and controls an operation of the program processing device 5. The packet retransmission control block 10, the network control block 21 and the application processing block 20 of the program processing device 5 are achieved by the program processing device 5 executing the control program 6 (packet retransmission control program). The control program 6 (packet retransmission control program) may be recorded on a computer-readable recording medium.

Figure 19:
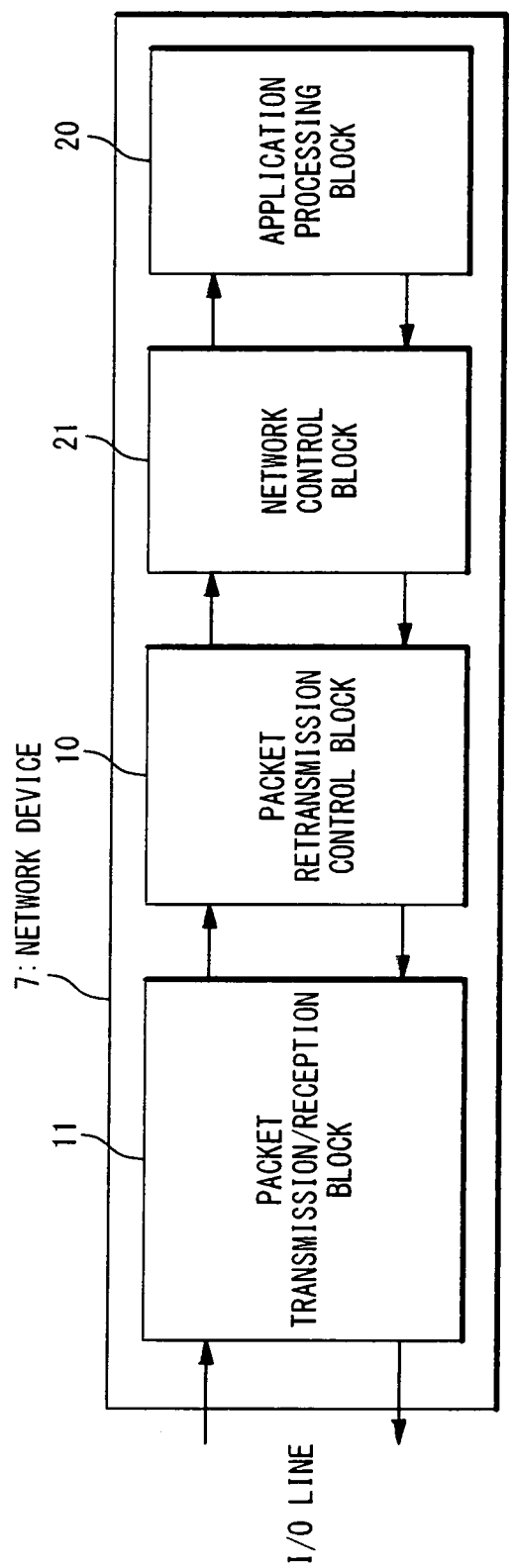
FIG. 19 is a block diagram showing yet another exemplary embodiment of the present invention.

FIG. 19 shows still another configuration example of the packet retransmission control system. In FIG. 19, the packet retransmission control system has a network device 7. In the present example, the network device 7 has the packet transmission/reception block 11, the packet retransmission control block 10, the network control block 21 and the application processing block 20. The function of each block is the same as in the case of the foregoing exemplary embodiments. Each block is achieved by hardware in the network device 7.

Figure 20:
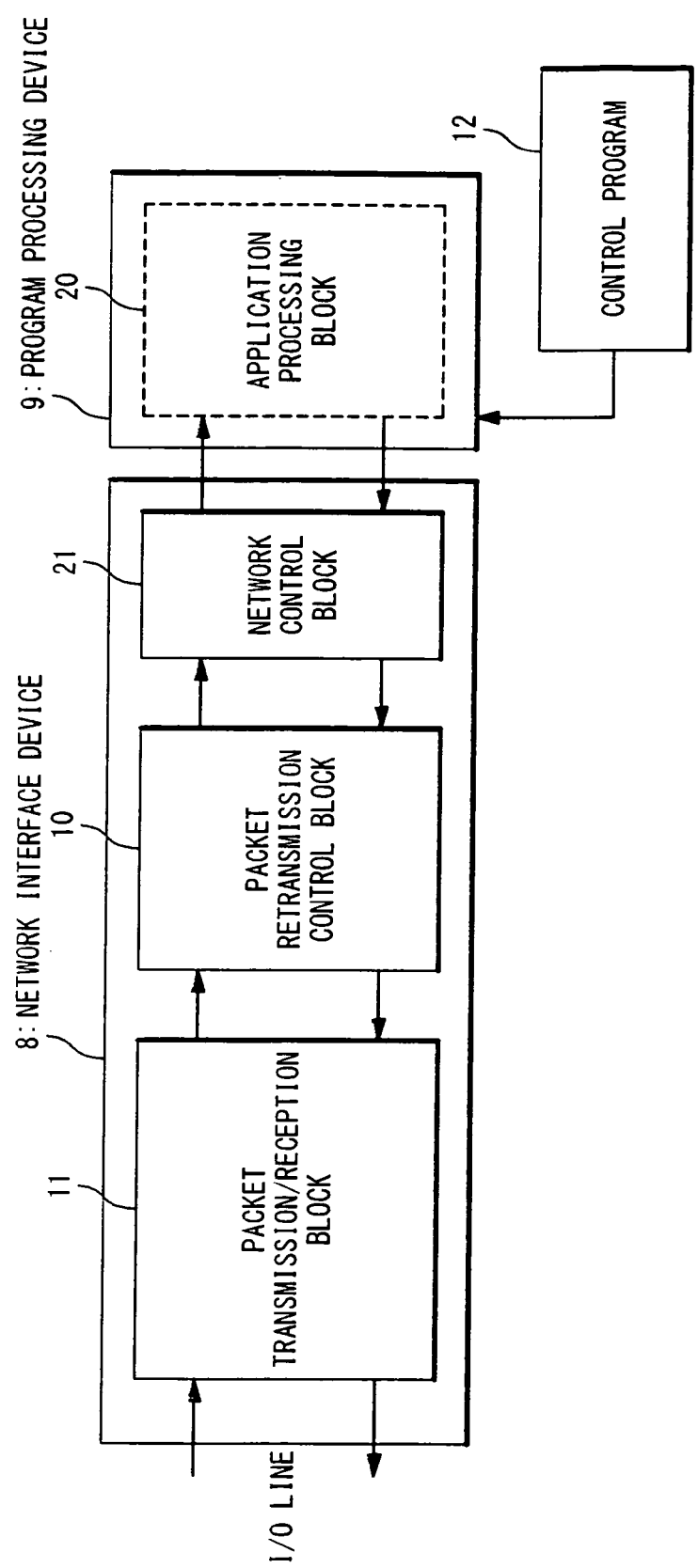
FIG. 20 is a block diagram showing still another exemplary embodiment of the present invention.

FIG. 20 shows still another configuration example of the packet retransmission control system. In FIG. 20, the packet retransmission control system has a network interface device 8, a program processing device 9 and a control program 12. The network interface device 8 is, for example, a NIC installed on a server as an extension card or an on-board card. The program processing device 9 is achieved by a CPU of a host, such as a server and a PC, and so on. In the present example, the network interface device 8 has the packet transmission/reception block 11, the packet retransmission control block 10 and the network control block 21, and the program processing device 9 has the application processing block 20. The function of each block is the same as in the case of the foregoing exemplary embodiments.

The control program 12 is a computer program executed by the program processing device 9, and controls an operation of the program processing device 9. The application processing block 20 of the program processing device 9 is achieved by the program processing device 9 executing the control program 12. The packet transmission/reception block 11, the packet retransmission control block 10 and the network control block 21 of the network interface device 8 are achieved by hardware.

Each of the configurations shown in FIGS. 18 to 20 may be applied to any of the foregoing first to third exemplary embodiments. Such the configuration also makes it possible to obtain the same effects as in the foregoing exemplary embodiments.

While the exemplary embodiments of the present invention have been described above with reference to the attached drawings, the present invention is not limited to these exemplary embodiments and can be modified as appropriate by those skilled in the art without departing from the spirit and scope of the present invention.

This application is based upon and claims the benefit of priority from Japanese patent application No. 2009-283353 filed on Dec. 14, 2009, the disclosure of which is incorporated herein in its entirely by reference.

The invention claimed is:

1. A packet retransmission control system, comprising:
   a network control block configured to perform packet retransmission control in an upper layer; and
   a packet retransmission control block configured to perform packet retransmission control with a shorter retransmission timeout than said upper layer in a lower layer that is lower than said upper layer,
   wherein, if said network control block receives a duplicate acknowledge packet comprising an acknowledge packet notifying a same sequence number for a predetermined number of times, said network control block performs packet retransmission,
   wherein said packet retransmission control block determines whether or not retransmission of a same packet is performed earlier in said upper layer than in said lower layer, and
   wherein, if said retransmission of said same packet is performed earlier in said upper layer than in said lower layer, said packet retransmission control block prohibits retransmission of said same packet in said lower layer.

2. The packet retransmission control system according to claim 1, wherein said packet retransmission control block comprises:
- a retransmission buffer in which packets for packet retransmission are stored;
- a control block; and
- an information memory block,
- wherein information stored in said information memory block includes a duplicate reception count that comprises a number of times of receiving said duplicate acknowledge packet by said network control block,
- wherein, if a packet forwarded from said packet retransmission control block to said network control block comprises said duplicate acknowledge packet, said control block increments said duplicate reception count,
- wherein said control block refers to said duplicate reception count in response to a predetermined trigger, and
- wherein, if said duplicate reception count is equal to or more than said predetermined number of times, said control block cancels retransmission of said same packet in said lower layer and releases said same packet stored in said retransmission buffer.

3. The packet retransmission control system according to claim 2, wherein said information stored in said information memory block further includes an acknowledged sequence number that comprises a sequence number already acknowledged in said upper layer,
- wherein, if said packet retransmission control block forwards an acknowledge packet in said upper layer to said network control block, said control block compares a latest sequence number comprising a sequence number acknowledged by said forwarded acknowledge packet with said acknowledged sequence number,
- wherein, if said latest sequence number is equal to said acknowledged sequence number, said control block determines that said forwarded acknowledge packet comprises said duplicate acknowledge packet and increments said duplicate reception count, and
- wherein, if said latest sequence number is newer than said acknowledged sequence number, said control block updates said acknowledged sequence number to said latest sequence number and initializes said duplicate reception count.

4. The packet retransmission control system according to claim 2, wherein said predetermined trigger comprises that a retransmission timeout regarding said same packet occurs in said lower layer, and
- wherein, if the retransmission timeout regarding said same packet occurs in said lower layer, said control block refers to said duplicate reception count.

5. The packet retransmission control system according to claim 4, wherein, if said duplicate reception count is less than said predetermined number of times, said control block performs retransmission of said same packet in said lower layer.

6. The packet retransmission control system according to claim 3, wherein said predetermined trigger comprises that said packet retransmission control block forwards an acknowledge packet in said upper layer to said network control block, and
- wherein said control block refers to said duplicate reception count, after said acknowledge packet in said upper layer is forwarded to said network control block and said duplicate reception count is updated.

7. The packet retransmission control system according to claim 6, wherein, if a retransmission timeout regarding said same packet occurs in said lower layer, said control block performs retransmission of said same packet in said lower layer.

8. A packet retransmission control method, comprising:
- performing packet retransmission control in an upper layer; and
- performing packet retransmission control with a shorter retransmission timeout than said upper layer in a lower layer that is lower than said upper layer,
- wherein said performing packet retransmission control in said upper layer comprises:
  - performing packet retransmission, if a duplicate acknowledge packet comprising an acknowledge packet notifying a same sequence number is received for a predetermined number of times, and
- wherein said performing packet retransmission control in said lower layer comprises:
  - determining whether or not retransmission of a same packet is performed earlier in said upper layer than in said lower layer; and
  - prohibiting retransmission of said same packet in said lower layer, if retransmission of said same packet is performed earlier in said upper layer than in said lower layer.

9. A packet retransmission control program recorded on a non-transitory computer-readable medium that, when executed, causes a computer to perform packet retransmission control processing, said packet retransmission control processing comprising:
- performing packet retransmission control in an upper layer; and
- performing packet retransmission control with a shorter retransmission timeout than said upper layer in a lower layer that is lower than said upper layer,
- wherein said performing packet retransmission control in said upper layer comprises:
  - performing packet retransmission, if a duplicate acknowledge packet comprising an acknowledge packet notifying a same sequence number is received for a predetermined number of times, and
- wherein said performing packet retransmission control in said lower layer comprises:
- determining whether or not retransmission of a same packet is performed earlier in said upper layer than in said lower layer; and
  - prohibiting retransmission of said same packet in said lower layer, if retransmission of said same packet is performed earlier in said upper layer than in said lower layer.

10. The packet retransmission control system according to claim 1, wherein a sender counts a number of duplicate acknowledge packets received from a receiver for determining whether or not a retransmit is executed.

11. The packet retransmission control system according to claim 10, wherein said retransmission of said same packet is restricted by previously determining an occurrence of said retransmission of said same packet in the upper layer based on the number of duplicate acknowledge packets received from the receiver.

12. The packet retransmission control system according to claim 1, wherein information including a duplicate reception count that comprises a number of times of receiving said duplicate acknowledge packet by said network control block is stored in said packet retransmission control block,
- wherein said control block refers to said duplicate reception count in response to a predetermined trigger, and wherein said predetermined trigger comprises that said packet retransmission control block forwards an acknowledge packet in said upper layer to said network control block.

13. The packet retransmission control system according to claim 12, wherein said control block refers to said duplicate reception count, after said acknowledge packet in said upper layer is forwarded to said network control block and said duplicate reception count is updated.

14. The packet retransmission control system according to claim 1, wherein, if a retransmission timeout regarding said same packet occurs in said lower layer, said control block performs retransmission of said same packet in said lower layer.

15. The method according to claim 8, wherein a sender counts a number of duplicate acknowledge packets received from a receiver for determining whether or not a retransmit is executed.

16. The method according to claim 15, wherein said retransmission of said same packet is restricted by previously determining an occurrence of said retransmission of said same packet in the upper layer based on the number of duplicate acknowledge packets received from the receiver.

17. The method according to claim 8, wherein, if a retransmission timeout regarding said same packet occurs in said lower layer, a retransmission of said same packet in said lower layer is performed.

18. The packet retransmission control program according to claim 9, wherein a sender counts a number of duplicate acknowledge packets received from a receiver for determining whether or not a retransmit is executed.

19. The packet retransmission control program according to claim 18, wherein said retransmission of said same packet is restricted by previously determining an occurrence of said retransmission of said same packet in the upper layer based on the number of duplicate acknowledge packets received from the receiver.

20. The packet retransmission control program according to claim 9, wherein, if a retransmission timeout regarding said same packet occurs in said lower layer, a retransmission of said same packet in said lower layer is performed.

\* \* \* \* \*